United States Patent
Umehara et al.

(10) Patent No.: US 8,184,662 B2
(45) Date of Patent: May 22, 2012

(54) COMMUNICATION SYSTEM, COMMUNICATION APPARATUS, AND CONTROL METHOD THEREOF

(75) Inventors: Makoto Umehara, Kawasaki (JP); Tomoyuki Takada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 12/035,390

(22) Filed: Feb. 21, 2008

(65) Prior Publication Data
US 2008/0219295 A1 Sep. 11, 2008

(30) Foreign Application Priority Data

Mar. 7, 2007 (JP) ................................. 2007-057242
Feb. 5, 2008 (JP) ................................. 2008-025235

(51) Int. Cl.
*H04J 3/24* (2006.01)
(52) U.S. Cl. ......... 370/474; 370/203; 370/465; 375/260
(58) Field of Classification Search .......... 370/203–208, 370/465, 468, 470, 474; 375/260–265
See application file for complete search history.

(56) References Cited

U.S. PATENT DOCUMENTS

| 5,757,416 | A | * | 5/1998 | Birch et al. | ................... | 725/144 |
| 5,822,381 | A | * | 10/1998 | Parry et al. | ................... | 375/356 |
| 2002/0071443 | A1 | * | 6/2002 | Tsukamoto et al. | .......... | 370/433 |
| 2004/0010727 | A1 | | 1/2004 | Fujinami | | |
| 2004/0161041 | A1 | * | 8/2004 | Logvinov et al. | ............. | 375/257 |

FOREIGN PATENT DOCUMENTS

| JP | 2001-036495 A | 2/2001 |
| JP | 2001-275194 A | 10/2001 |
| JP | 2003-037585 A | 2/2003 |

* cited by examiner

*Primary Examiner* — Ricky Ngo
*Assistant Examiner* — Kan Yuen
(74) *Attorney, Agent, or Firm* — Fitzpatrick, Cella, Harper & Scinto

(57) ABSTRACT

Data is transmitted by using continuous frames each of which includes a variable-length part having a length that varies depending on an input period and a fixed-length part containing data of one input period. The transmitted continuous frames are received, a frame period is detected, and data is reproduced based on the detected frame period.

9 Claims, 27 Drawing Sheets

FIG. 14
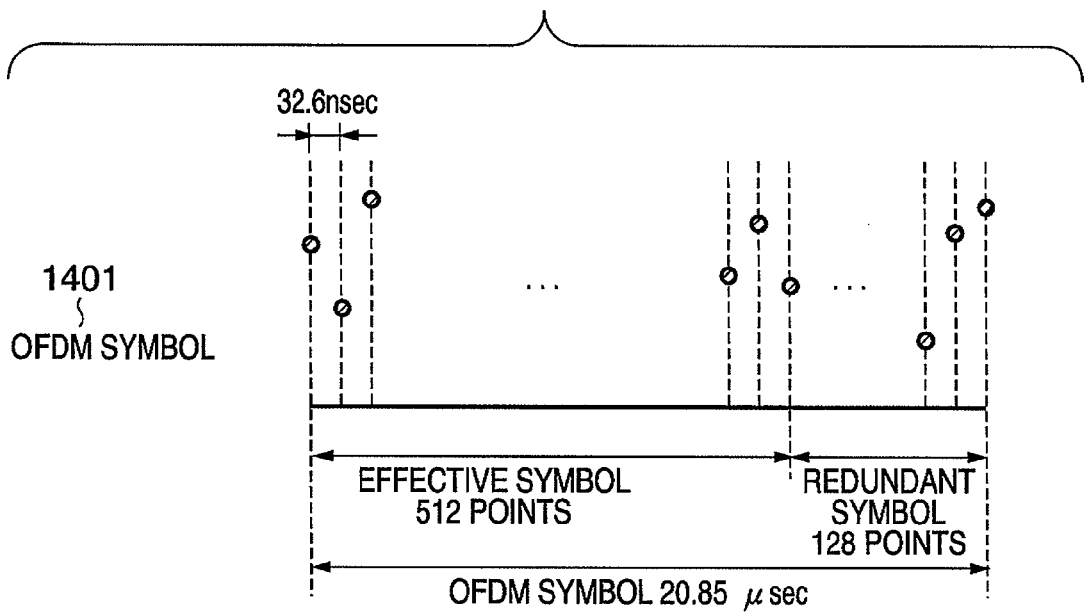
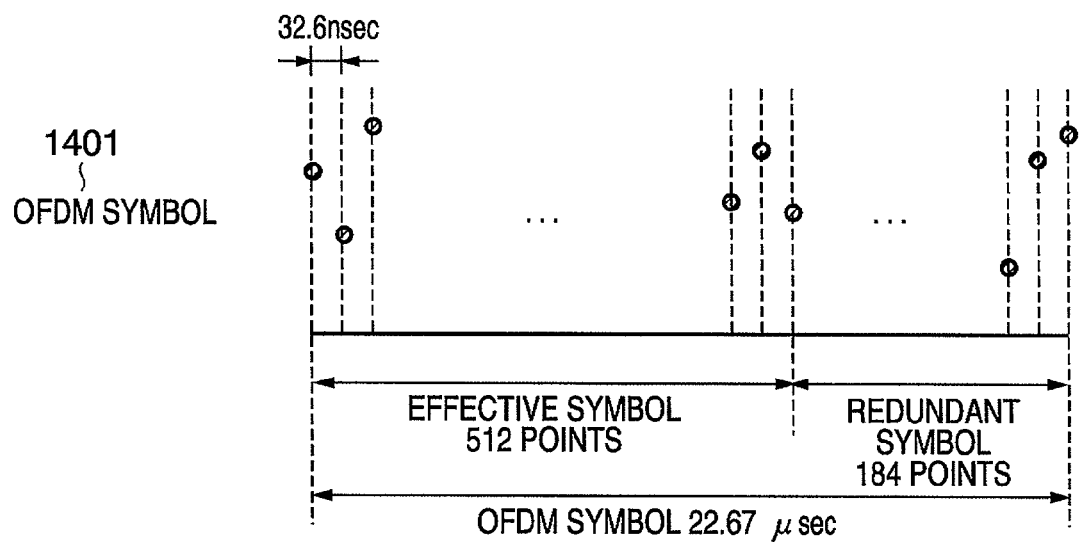

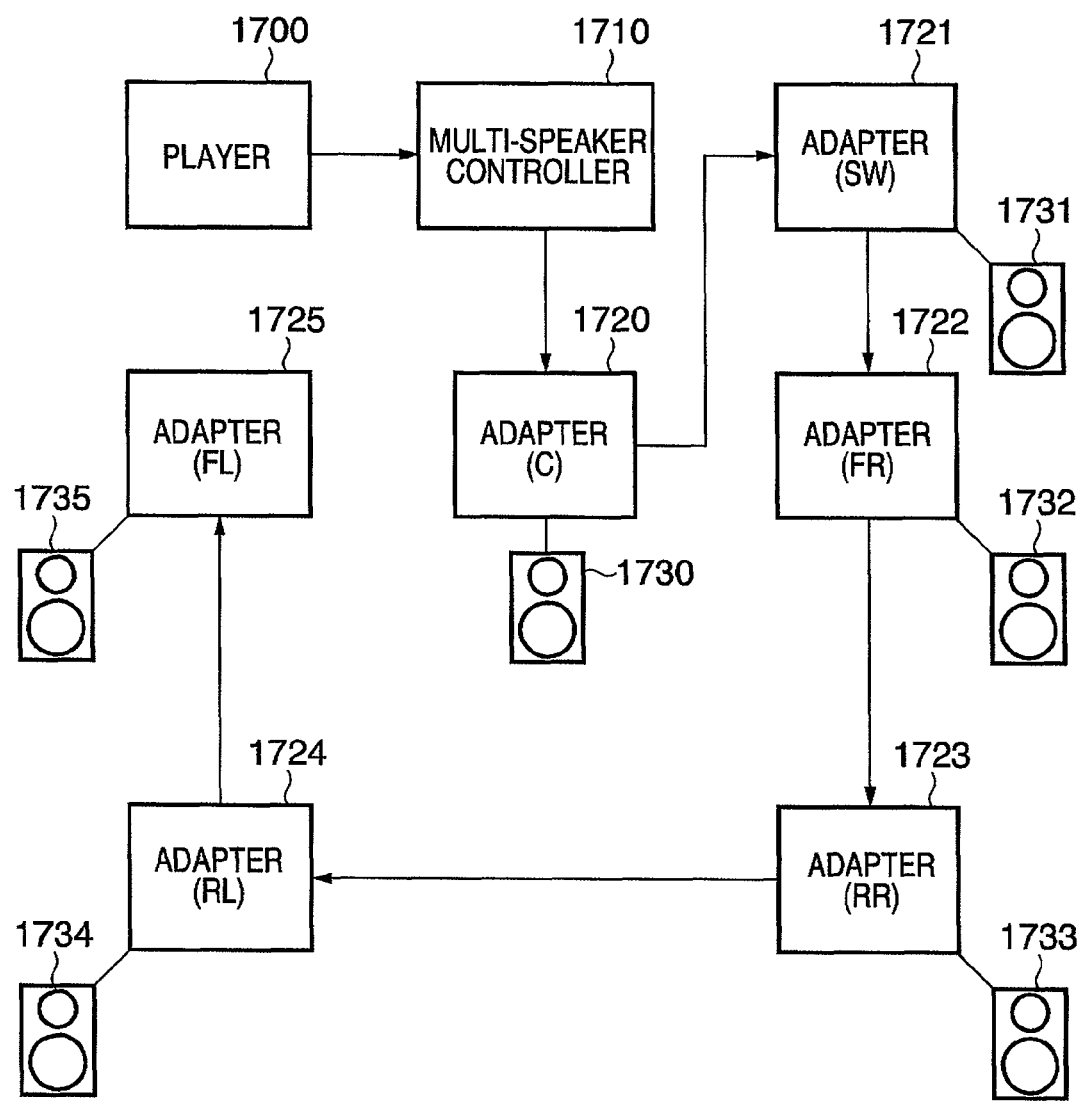
F I G. 17

F I G. 19

| C | FR | FL | RR | RL | SW | COMMAND |

COMMUNICATION SYSTEM, COMMUNICATION APPARATUS, AND CONTROL METHOD THEREOF

BACKGROUND OF THE INVENTION

1. Field of the Invention

The present invention relates to a communication system, a communication apparatus, and a control method thereof.

2. Description of the Related Art

Conventional multi-channel speaker systems are used with apparatuses such as a digital television set, a DVD player, and an AV amplifier to form a home theater. An example of a typical home theater is shown in FIG. 11. Reference numeral 1101 denotes a digital television set and 1102 denotes a DVD player. Reference numeral 1103 denotes an audio and video amplifier and reference numerals 1104 through 1109 denote six speakers forming a 5.1-channel surround sound system. For example, reference numeral 1104 denotes a subwoofer, 1105 denotes a center speaker, 1106 denotes a main left channel speaker, 1107 denotes a main right channel speaker, 1108 denotes a rear left channel speaker, and 1109 denotes a rear right channel speaker.

Requirements for audio data reproduction in a surround sound system include management of reproduction time. US2004-010727 (corresponding to Japanese Patent Laid-Open No. 2003-037585) proposes a method in which a time information delivery means is provided on a network, and speakers adjust their internal clock frequencies based on time information they received to determine the exact time and generate a synchronization signal based on a timestamp in audio data they received. Japanese Patent Laid-Open No. 2001-275194 proposes a method in which audio data to which a synchronization signal is added is transmitted at regular time intervals and speakers reproduce and output audio data based on the timing at which the synchronization signal is detected.

However, these methods require dedicated receiving circuits for generating and detecting synchronization signals. Another problem is that, when an audio source is changed, initial setting values for the receiving circuits must be re-set for each speaker, which adds a load on communication and control processing.

SUMMARY OF THE INVENTION

An object of the present invention is to solve the problems described above.

According to one aspect of the present invention, there is provided a communication system including a transmitter and a receiver, the transmitter comprising:

a first receiving unit that receives data input in a plurality of input periods;

a generating unit that generates continuous frames from data received by the receiving unit, each of the frames including a variable-length part having a length that varies depending on the input periods and a fixed-length part containing data of one period or n periods or one n-th of one period of the input periods, where n is a positive integer, and each of the frames having a period equal to one period or n periods or one n-th of one period of the input periods; and a transmitting unit transmitting the continuous frames generated by the generating unit;

the receiver comprising:

a second receiving unit receiving the continuous frames transmitted by the transmitting unit;

a detecting unit detecting a period of the frames received by the second receiving unit; and a reproducing unit reproducing data input in the plurality of input periods on the basis of the period of the frames detected by the detecting unit.

According to another aspect of the present invention, there is provided a communication apparatus comprising:

a receiving unit receiving data input in a plurality of input periods;

a generating unit generating continuous frames from data received by the receiving unit, each of the frames including a variable-length part having a length that varies depending on the input periods and a fixed-length part containing data of one period or n periods or one n-th of one period of the input periods, where n is a positive integer, and each of the frames having a period equal to one period or n periods or one n-th of one period of the input periods; and a transmitting unit transmitting the continuous frames generated by the generating unit.

According to still another aspect of the present invention, there is provided a control method in a communication system including a transmitter and a receiver, the method comprising:

at the transmitter, a first receiving step of receiving data input in a plurality of input periods;

a generating step of generating continuous frames from data received at the receiving step, each of the frames including a variable-length part having a length that varies depending on the input periods and a fixed-length part containing data of one period or n periods or one n-th of one period of the input periods, where n is a positive integer, and each of the frames having a period equal to one period or n periods or one n-th of one period of the input periods; and a transmitting step of transmitting the continuous frames generated at the generating step; and at the receiver, a second receiving step of receiving the continuous frames transmitted at the transmitting step;

a detecting step of detecting a period of the frames received at the second receiving step; and a reproducing step of reproducing data input in the plurality of input periods on the basis of the period of the frames detected at the detecting step.

According to yet another the present invention, there is provided a method for controlling a communication apparatus comprising the steps of:

receiving data input in a plurality of input periods;

generating continuous frames from data received at the receiving step, each of the frames including a variable-length part having a length that varies depending on the input periods and a fixed-length part containing data of one period or n periods or one n-th of one period of the input periods, where n is a positive integer, and each of the frames having a period equal to one period or n periods or one n-th of one period of the input periods; and transmitting the continuous frames generated at the generating step.

Further features of the present invention will become apparent from the following description of exemplary embodiments with reference to the attached drawings.

BRIEF DESCRIPTION OF THE DRAWINGS

FIG. 14 is a diagram showing OFDM symbols according to the third embodiment;

FIG. 17 is a block diagram of a 5.1-channel surround sound system;

FIG. 19 is a diagram showing a configuration of a data frame;

DESCRIPTION OF THE EMBODIMENTS

Communication systems according to embodiments of the present invention will be described below in detail with reference to the accompanying drawings.

First Embodiment

Figure 1:
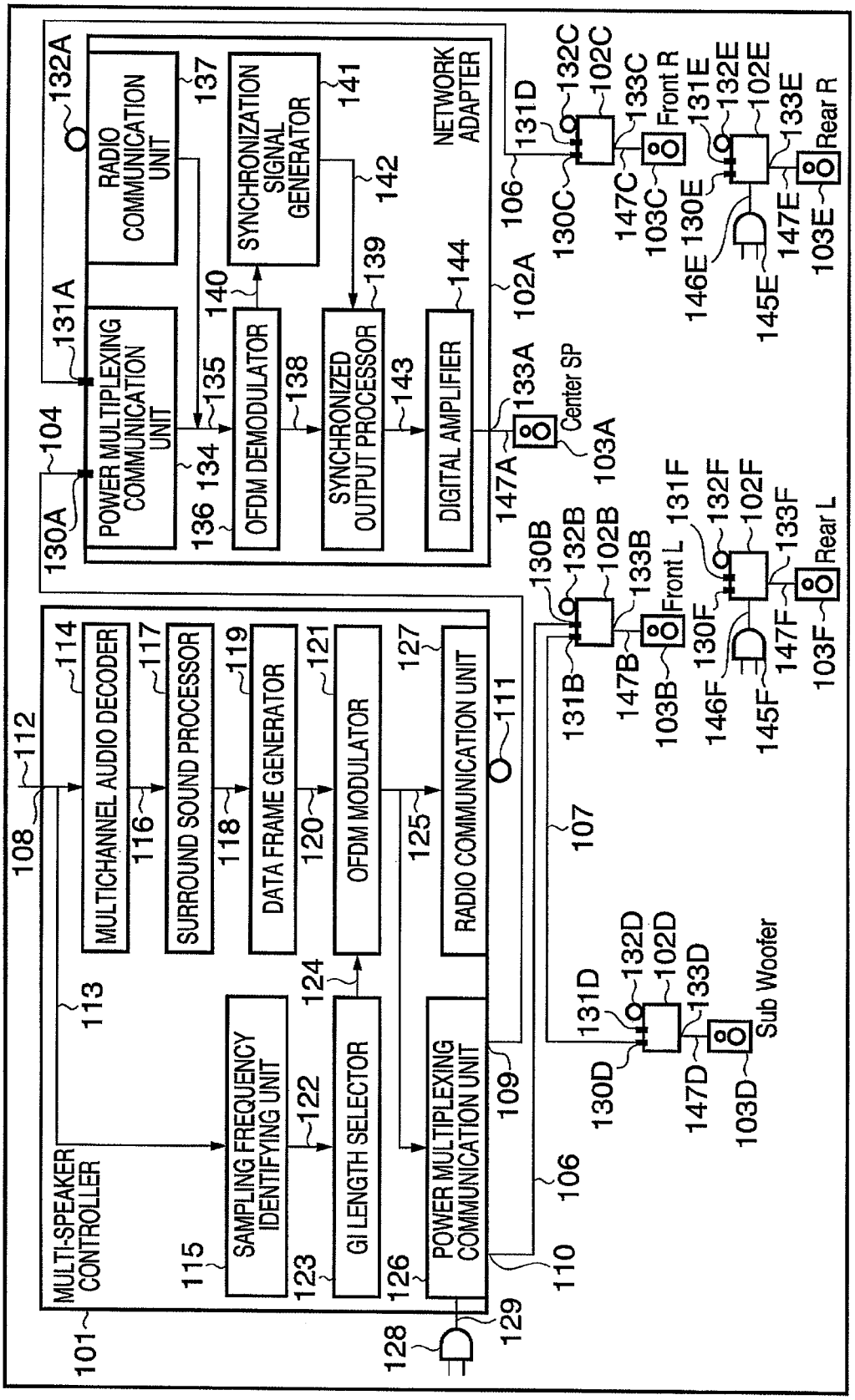
FIG. 1 is a network surround sound system according to an embodiment of the present invention.

FIG. 1 shows a system configuration of an exemplary network surround sound system to which the present invention is applied.

The network surround sound system shown in FIG. 1 includes a multi-speaker controller 101, network adapters 102A-102F, and speakers 103A-103F.

The multi-speaker controller 101 sends audio data input from a DVD player, not shown, to the network adapters 102A-102F.

Each of the network adapters 102A-102F receives audio data sent from the multi-speaker controller 101 and outputs the audio data to the speaker 103A-103F connected to that network adapter.

Each of the speakers 103A-103F outputs as sound a signal provided from the network adapters 102A-102F respectively, connected to the speakers.

The multi-speaker controller 101 and the network adapters 102A-102D are cascaded through cables 104-107 in FIG. 1.

Radio connections are established between the multi-speaker controller 101 and the network adapters 102E, 102F. In cable connection in the present embodiment, audio data sent from the multi-speaker controller 101 is multiplexed along with power from an AC power supply and transmitted. Accordingly, the network adapters 102A-102D connected through cables and the speakers 103A-103D connected to the network adapters 102A-102D are capable of operating without being connected to an AC power supply outlet.

A basic operation of the network surround sound system according to the present exemplary embodiment will be described with reference to the schematic configuration diagram of the multi-speaker controller 101 and the network adapters 102A-102F shown in FIG. 1.

The multi-speaker controller 101 includes an audio input terminal 108 and cable output terminals 109, 110, and a radio communication antenna 111.

The audio input terminal 108 is connected to a DVD player (not shown) through an HDMI cable 112 and is supplied with multi-channel audio data. Audio data of multiple sampling frequencies such as 44.1 kHz, 48 kHz, 96 kHz, and 192 kHz are supplied according to recording media and formats read by the DVD player.

Multi-channel audio data is transmitted to a multi-channel audio decoder 114 and a sampling frequency identifying unit 115 through a signal line 113.

The multi-channel audio decoder 114 decodes multi-channel audio data and outputs 5.1-channel audio data to a surround sound processor 117 through a signal line 116.

The surround sound processor 117 performs correction such as frequency characteristic correction, delay time correction, amplitude correction on audio data to be provided to each speaker and transmits the corrected audio data to a data frame generator 119 through a signal line 118.

The data frame generator 119 generates data frames conforming to a format, which will be described later, and sends the generated data frames to an OFDM modulator 121 through a signal line 120.

The sampling frequency identifying unit 115 analyzes the header of multi-channel audio data to identify the sampling frequency of the audio data and indicates the sampling frequency to a guard interval (hereinafter abbreviated as "GI") length selector 123 through a signal line 122. Here, the GI is a redundant component added to a signal when data is transmitted using OFDM (orthogonal frequency division multiplexing). A copy of a rear portion of an effective symbol, which will be described later, is called GI.

The GI length selector 123 selects a GI length based on a sampling frequency indicated. The GI length selector 123 sends information about the selected GI length to an OFDM (orthogonal frequency division multiplexing) modulator 121 through a signal line 124.

The OFDM modulator 121 OFDM-modulates a data frame based on the sent GI length information to generate an OFDM signal including a symbol having the same time length as the sampling period of the audio data. Modulation according to the present embodiment will be detailed later.

The OFDM signal generated is sent to a power multiplexing communication unit 126 and a radio communication unit 127 through a signal line 125.

A power plug 128 is connected to an AC power supply outlet and supplies electric power to the power multiplexing communication unit 126 through a power cable 129.

The power multiplexing communication unit 126 multiplexes an OFDM signal together with power from the AC power supply into a cable transmission signal and sends the cable transmission signal to the network adapters 102A, 102B through the cable output terminals 109, 110.

On the other hand, the radio communication unit 127 converts an OFDM signal to a radio frequency to produce a radio transmission signal and sends the radio transmission signal to the network adapters 102E, 102F through the antenna 111.

The network adapters 102A, 102B receive the cable transmission signal and transfer the received signal to the network adapters 102C, 102D in the next stage. The network adapters 102C, 102D receive the transferred cable transmission signal. The network adapters 102E, 102F receive the radio transmission signals. The network adapters 102A-102F have the same configuration and an internal configuration of only the network adapter 102A is shown in FIG. 1.

Each of the network adapters 102A-102F has a cable input terminal 130A-130F, a cable output terminal 131A-131F, a radio communication antenna 132A-132F, and a speaker terminals 133A-133F.

The cable input terminals 130A-130F are used for receiving a cable transmission signal. The cable output terminals 131A-131F are used for transferring a cable transmission signal. An operation of the network adapters 102A-102F will be described below with reference to the internal configuration of the network adapter 102A.

A cable transmission signal received at the cable input terminal 130A is sent to the power multiplexing communication unit 134. The power multiplexing communication unit 134 separates the power component from the cable transmission signal and sends only the OFDM signal to an OFDM demodulator 136 through a signal line 135.

A radio transmission signal received at the antenna 132A is sent to a radio communication unit 137, where the radio transmission signal is converted to a signal of a cable transmission frequency and then the signal is sent to the OFDM demodulator 136 through the signal line 135.

The OFDM demodulator 136 demodulates the OFDM signal into data frames and sends the data frames to a synchronized output processor 139 through a signal line 138. The OFDM demodulator 136 also outputs a symbol timing signal detected during the demodulation to a synchronization signal generator 141 though a signal line 140.

The synchronization signal generator 141 shapes the waveform of the symbol timing signal to generate a synchronization signal and outputs the synchronization signal to the synchronized output processor 139 through a signal line 142.

The synchronized output processor 139 extracts only data of its own channel from the data frame and sends its own channel data to a digital amplifier 144 through a signal line 143 at a timing based on the synchronization signal.

This channel data is amplified in the digital amplifier 144, is then provided to the speaker terminal 133A, and is output as sound through the speaker 103A.

The network adapters 102E, 102F need to be supplied with power from an AC power supply outlet because they are not connected by a cable. Reference numerals 145E and 145F denote power plugs for supplying power and reference numerals 146E and 146F denote power cables.

Speakers 103A-103F are connected to the speaker terminals 133A-133F of the network adapters 102A-102F through speaker cables 147A-147F and output sound.

The speakers 103A-103F in the present exemplary embodiment act as a center speaker, a front right speaker, a front left speaker, a sub woofer (SW), a rear right speaker, and a rear left speaker, respectively, and form a 5.1-channel surround sound system.

Figure 2:
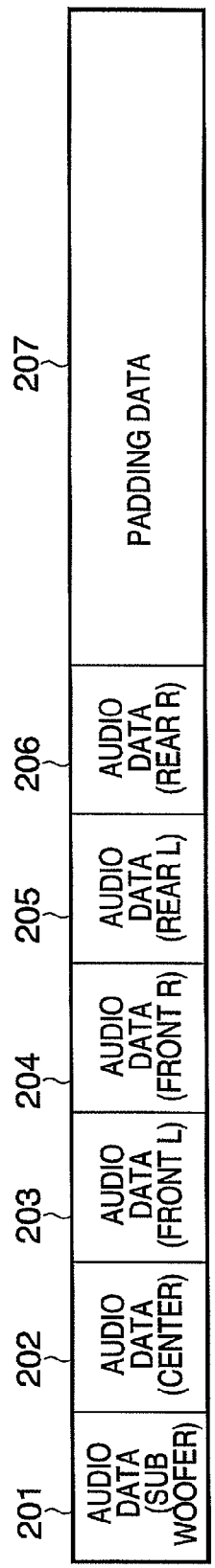
FIG. 2 shows a frame format.

FIG. 2 is a diagram showing an exemplary format of a data frame generated by the data frame generator 119.

As shown in FIG. 2, the data frame includes audio data 201-206 for 5.1 channels and padding data 207.

Each piece of audio data 201-206 is audio data at one sample point of each channel.

The padding data 207 is inserted in order to equate the number of bits of the data frame with the number of bits that can be transmitted in one OFDM symbol.

It is assumed here that sub woofer, center, front left, front right, rear left, and real right data are assigned to the audio data 201-206 in this order and each of the network adapters 102A-102F extracts its own channel data. However, the format of a data frame is not limited to the format shown in FIG. 2. Any format may be used from which the network adapters 102A-102F can extract their own channel data.

Details of operations of the multi-speaker controller 101 and the network adapters 102A-102F in the present embodiment will be described next. It is assumed that fundamental specifications for the OFDM modulator/demodulator in the present embodiment are as given below.

(1) The number of FFT points: 512
(2) D/A conversion frequency: 30.7 MHz

Modification method and the number of used carriers are arbitrary. It is also assumed in the following description that the mean frequency of cable and radio transmission signals is arbitrary.

The present embodiment will be described with respect to a case where a bus data transmission mode is used.

Figure 3:
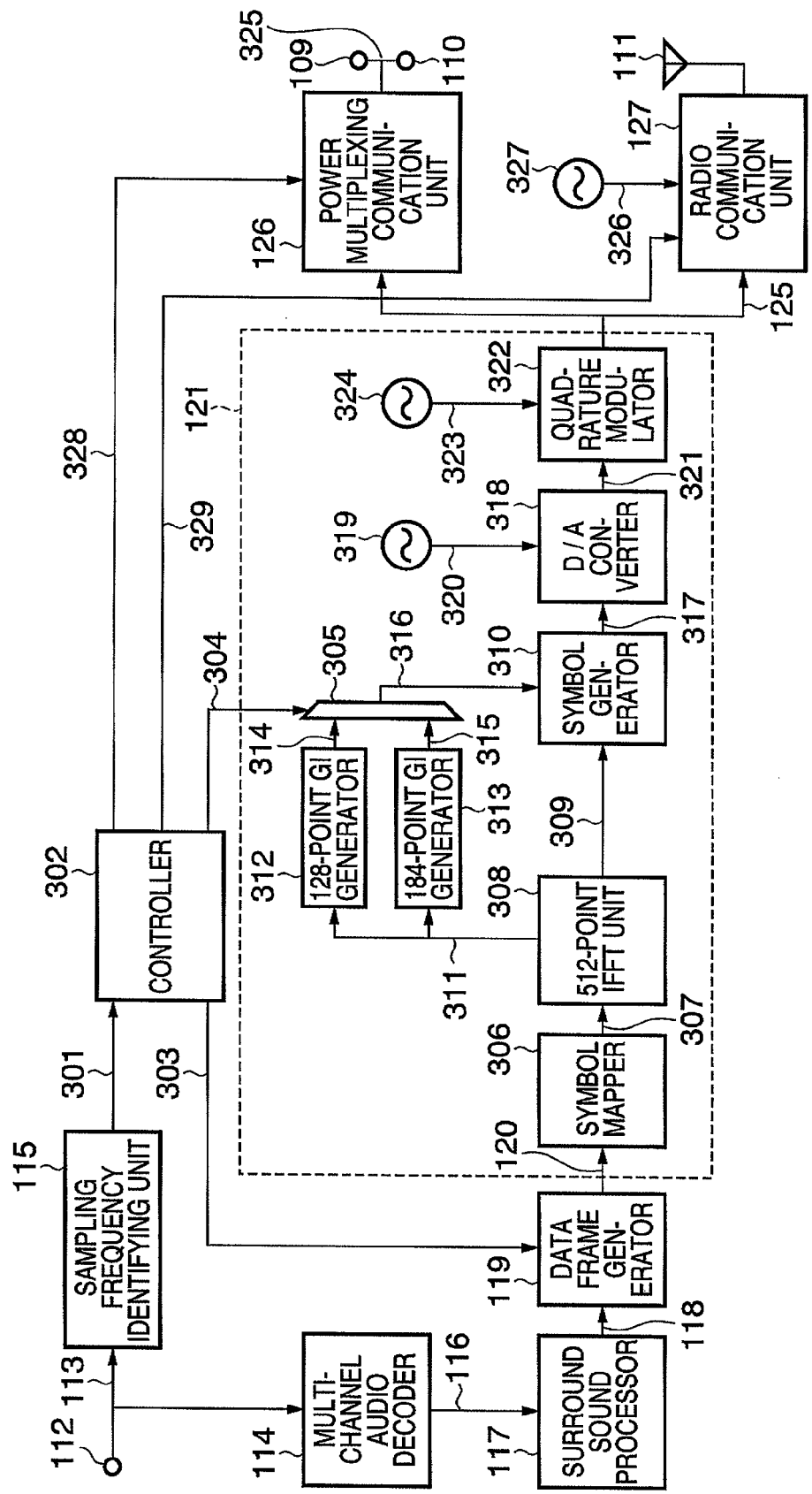
FIG. 3 is a block diagram showing an internal configuration of multi-speaker controller 101 according to a first embodiment.
Figure 4:
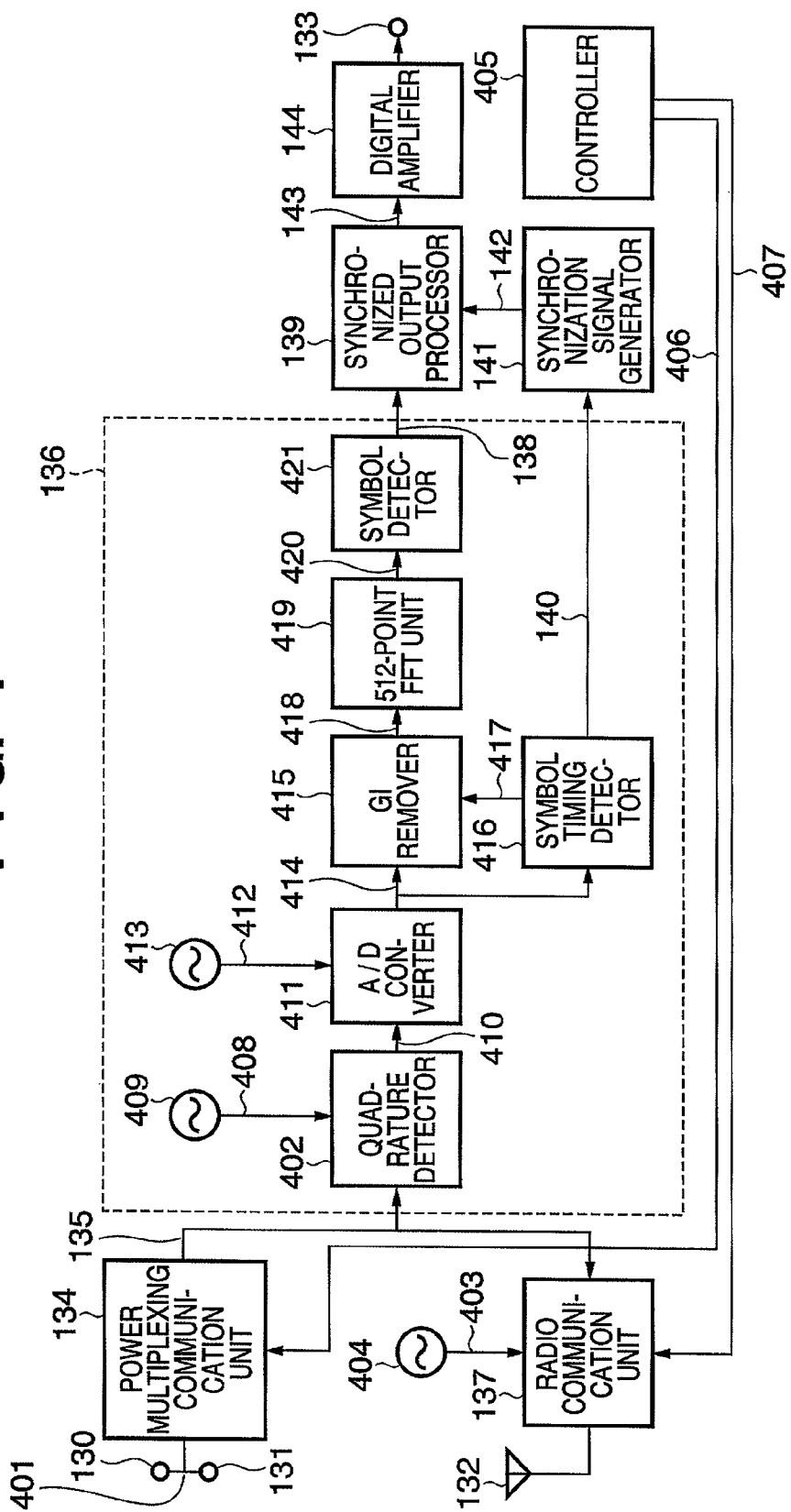
FIG. 4 is a block diagram showing an internal configuration of a speaker adapter 102A-102F according to the first embodiment.

FIG. 3 is a functional block diagram showing a configuration of the multi-speaker controller 101 in detail and FIG. 4 is a functional block diagram showing a configuration of the network adapter 102A-102F in detail.

The same blocks in FIGS. 3 and 4 as those in FIG. 1 are labeled with the same reference numerals.

A sampling frequency identifying unit 115 in FIG. 3 provides sampling frequency information of audio data to a controller 302 through a signal line 302. It is assumed here that the sampling frequency of the audio data is any of 44.1 kHz and 48 kHz.

The controller 302 directs a data frame generator 119 through a signal line 303 to generate a data frame conforming to the format shown in FIG. 2. The controller 302 also controls a GI selector 305 through a signal line 304.

In particular, when the sampling frequency is 48 kHz, the controller 302 controls the GI selector 305 so as to select an output from a 128-point GI generator 312. When the sampling frequency is 44.1 kHz, the controller 302 controls the GI selector 305 so as to select an output from a 184-point GI generator 313.

The data frame generator 119 outputs the generated data frame to a symbol mapper 306 through a signal line 120.

The symbol mapper 306 converts the data frame to a 512-point complex symbol and sends the complex symbol to a 512-point IFFT (Inverse Fast Fourier Transform) unit 308 through a signal line 307.

The 512-point IFFT unit 308 transforms the complex symbol using IFFT to generate a 512-point effective symbol.

The generated effective symbol is sent to a symbol generator 310 through a signal line 309. The generated effective symbol is also sent to the 128-point GI generator and the 184-point GI generator 313 through a signal line 311.

The 128-point GI generator 312 and the 184-point GI generator 313 copy 128 points and 184 points, respectively, starting from the back end of the effective symbol, to generate GIs, and send them to the GI selector 305 through signal lines 314 and 315. The 128-point GI generator 312 and the 184-point GI generator 313 may delete a sample value string including any number of pieces of data from the beginning of the generated GI and add a fixed pattern symbol such as a preamble to that portion to generate redundant symbols as a GI.

The GI selector 305 selects one of the 128-point GI and the 184-point GI according to an instruction from the controller 302 and sends it to the symbol generator 310 through a signal line 316.

The symbol generator 310 adds the GI selected by the GI selector 305 to the forward end of the effective symbol to generate an OFDM symbol and outputs it to a D/A converter 318 through a signal line 317.

A frequency oscillator 319 sends a clock signal of 30.7 MHz to the D/A converter 318 through a signal line 320.

The D/A converter 318 converts the OFDM symbol to a continuous-time signal based on the clock signal output from the frequency oscillator 319 to generate a complex baseband signal and sends the complex baseband signal to a quadrature modulator 322 through a signal line 321.

The quadrature modulator 322 quadrature-modulates the complex baseband signal into a cable transmission signal based on a sinusoidal signal input from a frequency oscillator 324 through a signal line 323.

The cable transmission signal is sent to a power multiplexing communication unit 126 and a radio communication unit 127 through a signal line 125.

The cable transmission signal multiplexed together with power at the power multiplexing communication unit 126 is output to the cable output terminals 109 and 110 through a signal line 325.

The radio communication unit 127 frequency-converts the cable transmission signal by using a sinusoidal signal provided from a frequency oscillator 327 through a signal line 326 and outputs the signal to an antenna 111. The power multiplexing communication unit 126 and the radio communication unit 127 are controlled by the controller 302 through signal lines 328 and 329.

On the other hand, a cable transmission signal received at a cable input terminal 130 in FIG. 4 is sent to a power multiplexing communication unit 134 through a signal line 401. If a network adapter in the next stage is connected through a cable output terminal 131, the cable transmission signal received at the cable input terminal 130 is transferred to the network adapter in the next stage.

The cable transmission signal separated from the power component at the power multiplexing communication unit 134 is sent to a quadrature detector 402 and a radio communication unit 137 through the signal line 135. If a network adapter in the next stage is connected through the radio communication unit 137, the signal is transferred as a radio transmission signal from the radio communication unit 137 to the network adapter in the next stage.

A radio transmission signal received at an antenna 132 is frequency-converted at the radio communication unit 137 by using a sinusoidal signal sent from a frequency oscillator 404 through a signal line 403. The frequency-converted radio transmission signal is sent to the quadrature detector 402 through the signal line 135.

The power multiplexing communication unit 134 and the radio communication unit 137 are controlled by a controller 405 through signal lines 406 and 407.

The quadrature detector 402 performs quadrature detection on a received signal by using a sinusoidal signal provided from a frequency oscillator 409 through a signal line 408. The quadrature detector 402 sends a complex baseband signal obtained through the quadrature detection to an A/D converter 411 through a signal line 410.

The A/D converter 411 converts the complex baseband signal to a discrete-time signal in accordance with a clock signal of 30.7 MHz provided from a frequency oscillator 413 through a signal line 412 and sends the discrete-time signal to a GI remover 415 and a symbol timing detector 416 through a signal line 414.

The symbol timing detector 416 calculates the correlation sum of the discrete-time signal and the discrete-time signal delayed by one effective symbol length (512 points) and detects a symbol timing based on the correlation value.

The detected symbol timing signal is sent to the GI remover 415 and the synchronization signal generator 141 through signal lines 417 and 140.

The GI remover 415 determines the length of the GI and removes the GI based on the symbol timing signal. The GI remover 415 sends an effective symbol consisting of 512 points obtained through the GI removal to a 512-point FFT unit 419 through a signal line 418.

The 512-point FFT unit 419 transforms the effective symbol by fast Fourier transform to generate a 512-point complex symbol and sends the complex symbol to a symbol detector 421 through a signal line 420.

The symbol detector 421 detects the complex symbol, demodulates the complex symbol to a data frame, and sends the data frame to a synchronized output processor 139 through a signal line 138.

Figure 5:
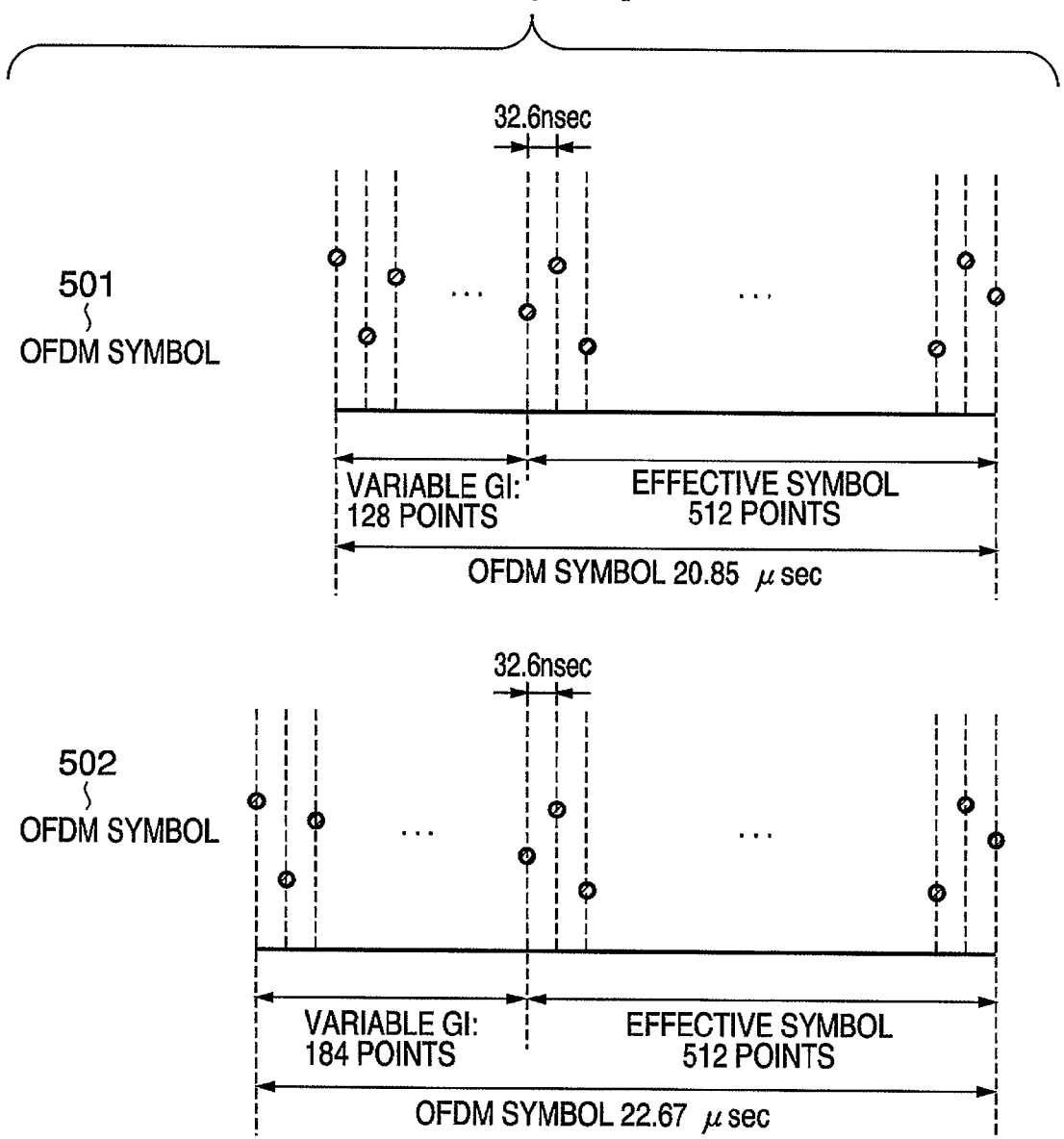
FIG. 5 is a diagram showing OFDM symbols according to the first embodiment.
Figure 6:
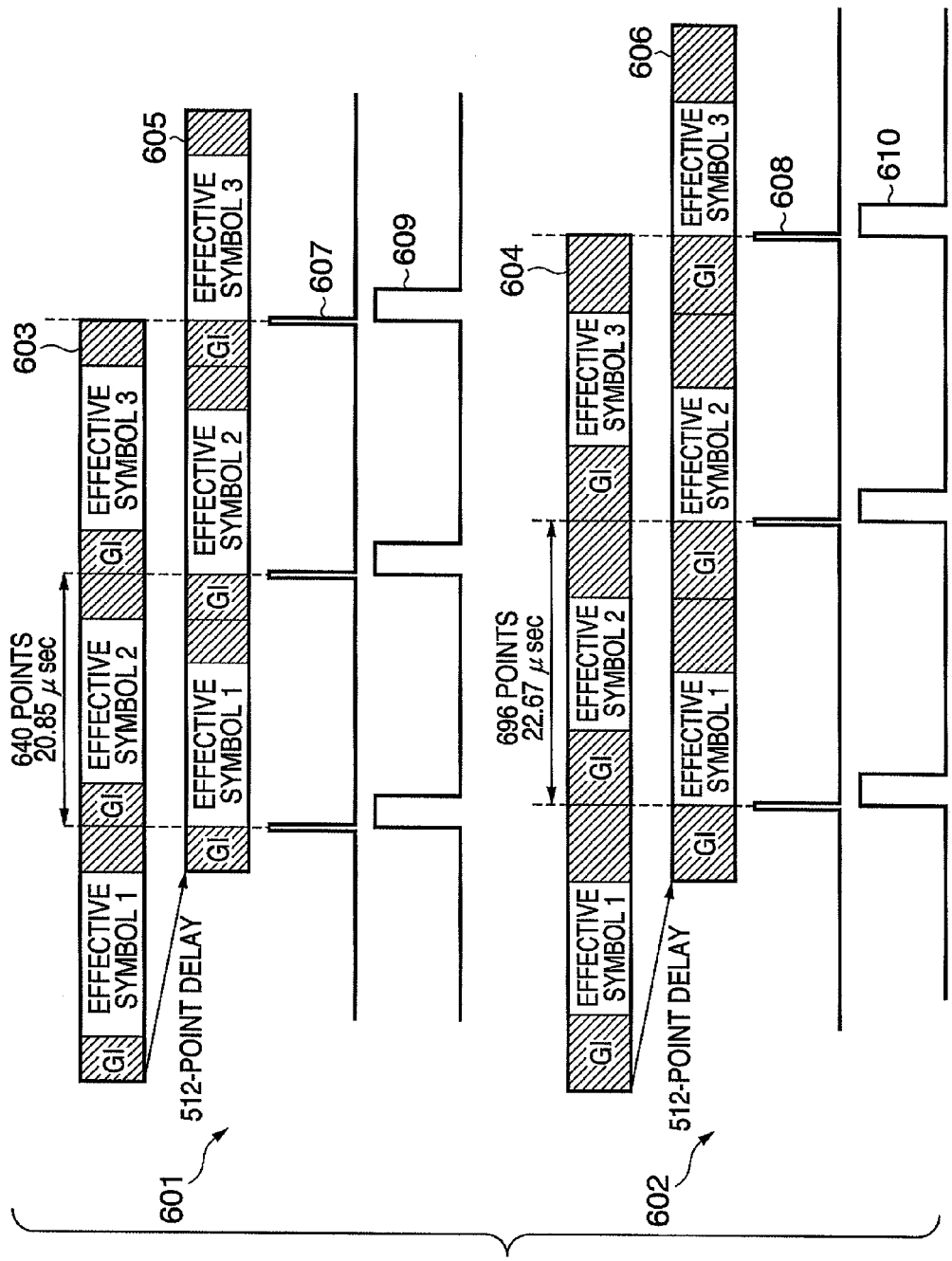
FIG. 6 is a diagram showing processing for generating a synchronization signal.

A method for performing synchronized output in network adapters 102A-102F will be describe with reference to FIGS. 5 and 6. FIG. 5 is a diagram illustrating OFDM symbols generated at the multi-speaker controller 101. FIG. 6 is a diagram illustrating synchronization signals generated at the network adapters 102A-102F.

FIG. 5 shows examples of OFDM symbols 501, 502 generated in the multi-speaker controller 101.

Reference numeral 501 denotes an OFDM symbol generated when the sampling frequency of audio data is 48 kHz and reference numeral 502 denotes an OFDM symbol generated when the sampling frequency of audio data is 44.1 kHz.

The OFDM symbols 501, 502 include a 512-point effective symbol and, a 128-point GI and a 184-point GI, respectively.

The OFDM symbols 501, 502 are converted to continuous-time signals at a D/A conversion frequency of 30.7 MHz (32.6 nsec period) in the D/A converter 318 of the multi-speaker controller 101.

Thus, the time lengths of the OFDM symbols 501 and 502 are 20.85 μsec (32.6 nsec*640 points) and 22.67 μsec (32.6 nsec*696 points), respectively. By making the length of the effective signal fixed and the length of the GI variable in this way, the time length of the OFDM symbol can be made equal to the sampling period of audio data.

Part 601 of FIG. 6 illustrates generation of a synchronization signal when a network adapter 102A-102F has received OFDM symbol 501.

Part 602 shows generation of a synchronization signal when the network adapter 102A-102F has received OFDM symbol 502.

Reference numerals 603 and 604 denote discrete signals output from the A/D converter 411.

Reference numerals 605 and 606 denote the discrete signals 603, 604 delayed by one effective symbol (512 points) (delayed discrete signals).

Reference numerals 607 and 608 denote symbol timing signals detected by calculating the correlation sum of the discrete signals 603, 604, respectively, and the delayed discrete signals 605, 606, respectively. A symbol timing can be detected by calculating the correlation sum because a GI is a copy of the back end portion of the effective symbol and therefore the back end portion of the discrete signal and the forward end of the delayed discrete signal are strongly correlated with each other.

Thus, the time periods of the symbol timing signals 607, 608 are equal to the time lengths of the OFDM symbols and are 20.85 μsec (48 kHz) and 22.67 μsec (44.1 kHz), respectively. Consequently, the frequency of the symbol timing signal is equal to the sampling frequency of audio data.

Reference numerals 609 and 610 denote synchronization signals generated by the synchronization signal generator 141.

The synchronization signal generator 141 shapes the waveform of a symbol timing signal to generate a synchronization signal like synchronization signals 609 and 610 and outputs it to the synchronized output processor 139.

The synchronized output processor 139 extracts data of the own channel at a timing based on the synchronization signal and outputs its own channel data to the digital amplifier 144.

This channel data extracted is audio data at one sample point. Accordingly, audio data at one sample point is output to the digital amplifier 144 in each sampling period of the audio data and sound is output from the speaker.

Because a bus data transmission mode is used in the present exemplary embodiment, the network adapters 102A-102F detect the symbol timing signal at the same timing. Accordingly, the speakers 103A-103F connected to the network adapters 102A-102F output sound at the same timing. Thus, sound outputs in the system can be synchronized with each other.

According to the present invention, the configuration of the network adapters 102A-102F relating to processing for synchronized output can be simplified because the symbol timing signal detected at the OFDM demodulator is used as the synchronization signal.

Furthermore, the present invention eliminates the need for reconfiguration and the like of the system at the network adapters 102A-102F when the audio source is changed, because audio data at one sample point is reproduced at a timing based on the symbol timing.

Thus, the synchronized transmission system according to the present exemplary embodiment eliminates the need for transmitting and receiving circuits dedicated to synchronization. In addition, an increase in the load on communication and control processing placed when the audio source is changed can be minimized.

Second Embodiment

The network surround sound system described in the first embodiment and shown in FIG. 1 uses bus data transmission mode. A second embodiment will be described in which a network surround sound system as shown in FIG. 1 uses a daisy chain data transmission mode. The second embodiment differs from the first embodiment in the internal configurations and operations of multi-speaker controller 101 and network adapters 102A-102F. The following description will focus on the differences from the first embodiment.

Figure 7:
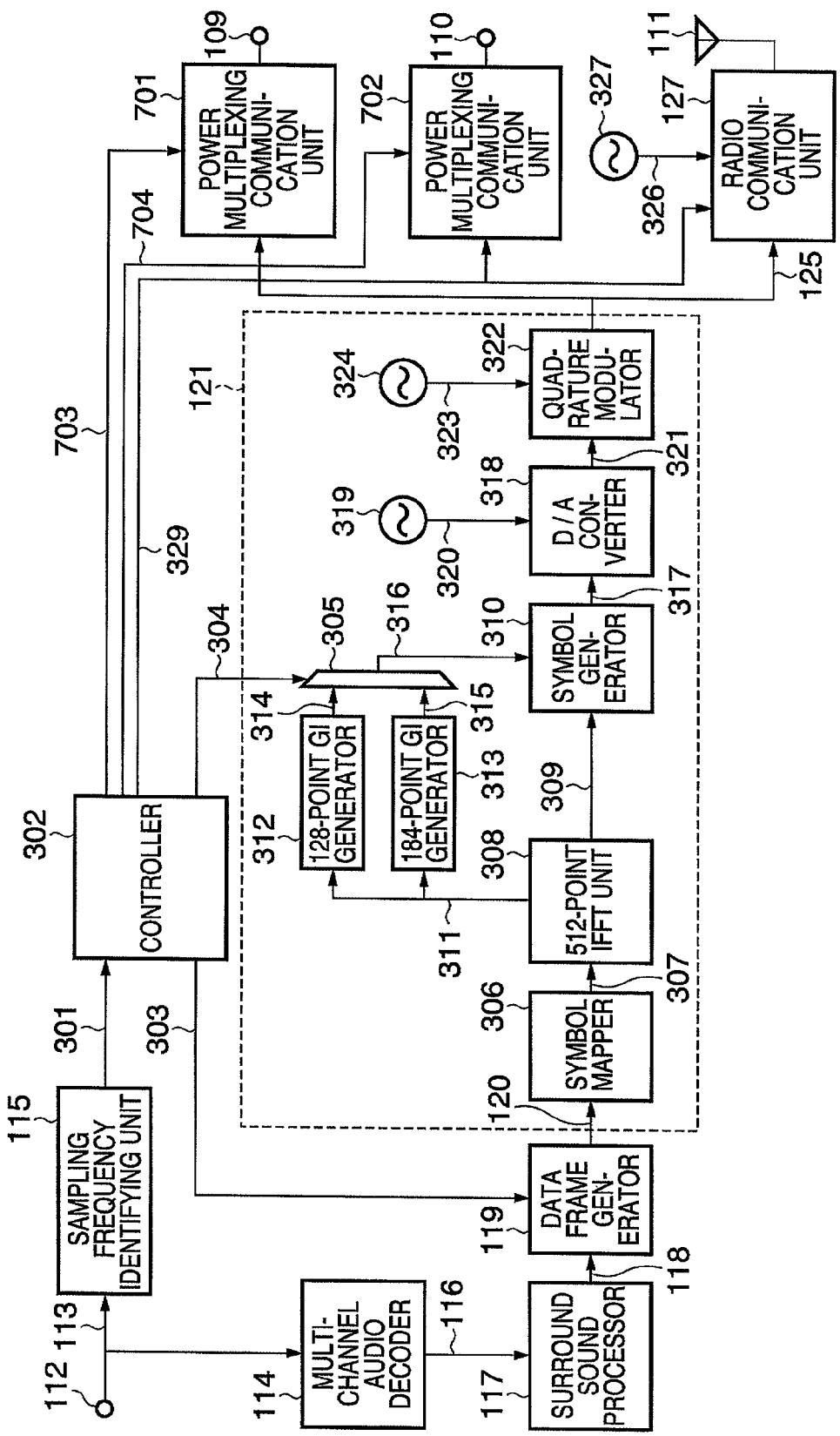
FIG. 7 is a block diagram showing an internal configuration of a multi-speaker controller 101 according to a second embodiment.
Figure 8:
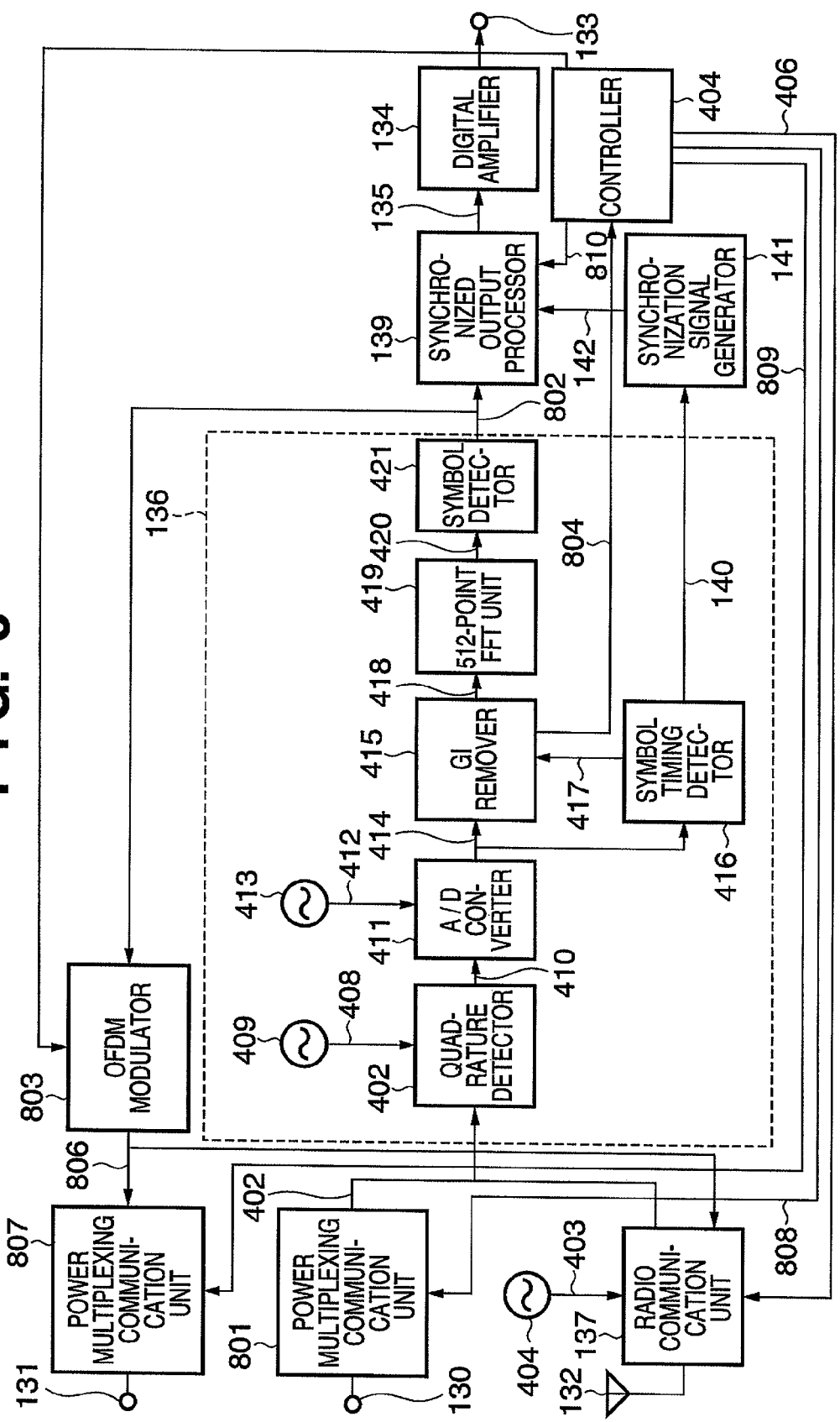
FIG. 8 is a block diagram showing an internal configuration of a speaker adapter 102A-102F according to the second embodiment.

FIG. 7 is a block diagram showing a detailed configuration of a multi-speaker controller 101 according to the second embodiment. FIG. 8 is a functional block diagram showing a detailed configuration of a network adapters 102A-102F. In FIGS. 7 and 8, the same blocks as those in FIGS. 3 and 4 will be labeled with the same reference numerals.

Reference numerals 701 and 702 in FIG. 7 denote power multiplexing communication units which multiplex an OFDM signal sent from an OFDM modulator 121 together with power and output a cable transmission signal through cable output terminals 108, 109.

Reference numerals 703 and 704 denote signal lines for controlling the power multiplexing communication units 701, 702. The rest of the configuration is the same as that shown in FIG. 3, the description of which will be omitted.

Reference numeral 801 in FIG. 8 denotes a power multiplexing communication unit which separates a power component from a signal received from a cable input terminal 130 and sends only a signal component to a quadrature detector 402.

Reference numeral 802 denotes a signal line for sending demodulated data frames to a synchronized output processor 139. The signal line 802 is also used for sending demodulated data frames to an OFDM modulator 803.

A GI remover 415 removes GIs from a discrete-time signal output from an A/D converter 411, sends only effective symbols to an FFT unit 419, and indicates the number of points of the removed GIs to a controller 404 through a signal line 804.

The controller 404 sends GI length information based on the indicated number of points of GIs to the OFDM modulator 803 through a signal line 805.

The OFDM modulator 803 OFDM-modulates the data frames based on the GI length information sent from the controller 404 to generate the same OFDM signal as the received signal.

The internal configuration of the OFDM modulator 803 is the same as that of the OFDM modulator 121, the description of which will be omitted.

The OFDM signal is sent to a power multiplexing communication unit 807 and a radio communication unit 137 through a signal line 806 and is transferred as cable and radio transmission signals to a network adapter in the next stage.

Reference numerals 808 and 809 denote control signal lines. The power multiplexing communication units 801, 807 are controlled by the controller 404.

Signal line 810 is used by the controller 404 to set a frame delay correction value, which will be described later, for a synchronized output processor 139.

The synchronized output processor 139 temporarily buffers data frames sent from an OFDM demodulator 136, counts the synchronization signals output from a synchronization signal generator 141 until the frame delay correction value is reached, then performs output processing. The synchronized output processing in the second embodiment will be described later.

A frame delay that occurs in the second embodiment will be described next.

Figure 9:
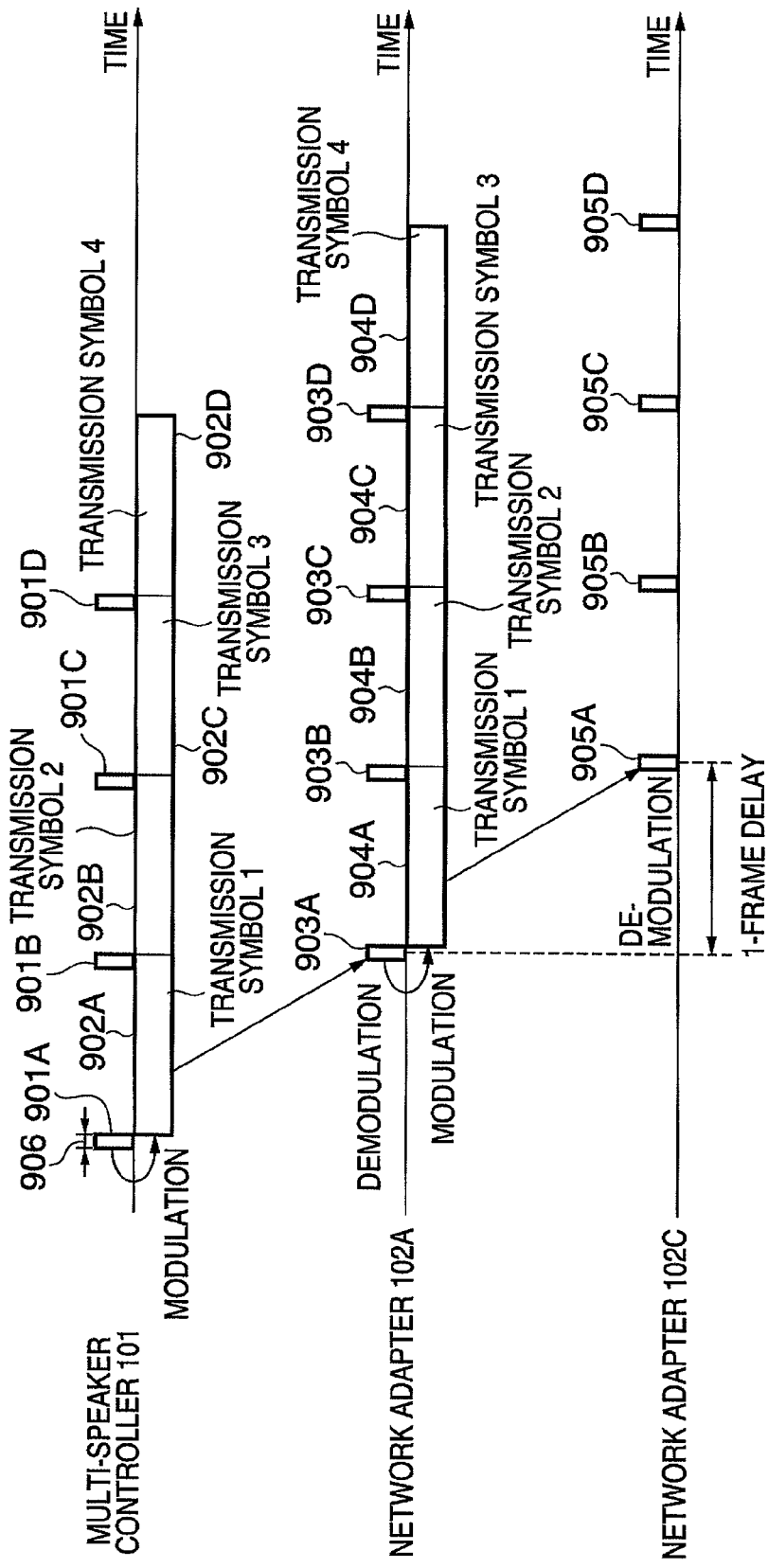
FIG. 9 is a diagram showing data transmission.

FIG. 9 shows data transmission from the multi-speaker controller 101 to the network adapter 102A and from the network adapter 102A to the network adapter 102C.

Reference numerals 901A to 901D in FIG. 9 denote data frames output from a data frame generator 119 of the multi-speaker controller 101 to an OFDM modulator 121.

Reference numerals 902A to 902D denote OFDM symbols output from an OFDM modulator 127 by OFDM-modulating data frames 901A-901D.

Reference numerals 903A to 903D denote data frames output from an OFDM demodulator 136 of the network adapter 102A which has received OFDM symbols 902A-902D.

The OFDM modulator 803 of the network adapter 102A OFDM-modulates data frames 903A-903D and sends the modulated data frames to the network adapter 102C.

Reference numerals 904A to 904D denote OFDM symbols output from the OFDM modulator 803.

Reference numerals 905A-905D denote data frames output from the OFDM demodulator 136 of the network adapter 102C which has received OFDM symbols 904A-904D.

It is assumed here that the internal operation clocks of the multi-speaker controller 101 and the network adapters 102A and 102C are sufficiently fast and, accordingly, the time 906 taken for outputting a data frame to the OFDM modulator and the time required for modulation and demodulation are sufficiently short compared with the time length of an OFDM symbol and are negligible.

As shown in 903A-903D and 905A-905D, data frames demodulated at the network adapter 102C that should be output at the same timing as data frames demodulated at the network adapter 102A, delay by one frame as compared with the data frames demodulated at the network adapter 102A.

Because a frame delay that depends on the number of transfers between network adapters occurs in the second embodiment, a frame delay correction value is set in the network adapters 102A-102F in order to achieve synchronization of outputs.

The frame delay correction value set in each of the network adapters 102A-102F are a difference values between the maximum number of delayed frames in the system and the number of delayed frames in each network adapter.

In the example in FIG. 1, the number of delayed frames in the network adapters 102A, 102B, 102E, and 102F is 0 and the number of delayed frames in the network adapters 102C and 102D is 1. Accordingly, the maximum number of delayed frames is 1 and a frame correction value of 1 is set in the network adapters 102A, 102B, 102E, and 102F.

In the network adapters 102C and 102D, a frame delay correction value of 0 is set. The frame delay correction value may be automatically set in the network adapters 102A-102F by the multi-speaker controller 101 or manually set in each network adapter by a user.

A method for synchronizing outputs in the second embodiment will be described.

Figure 10:
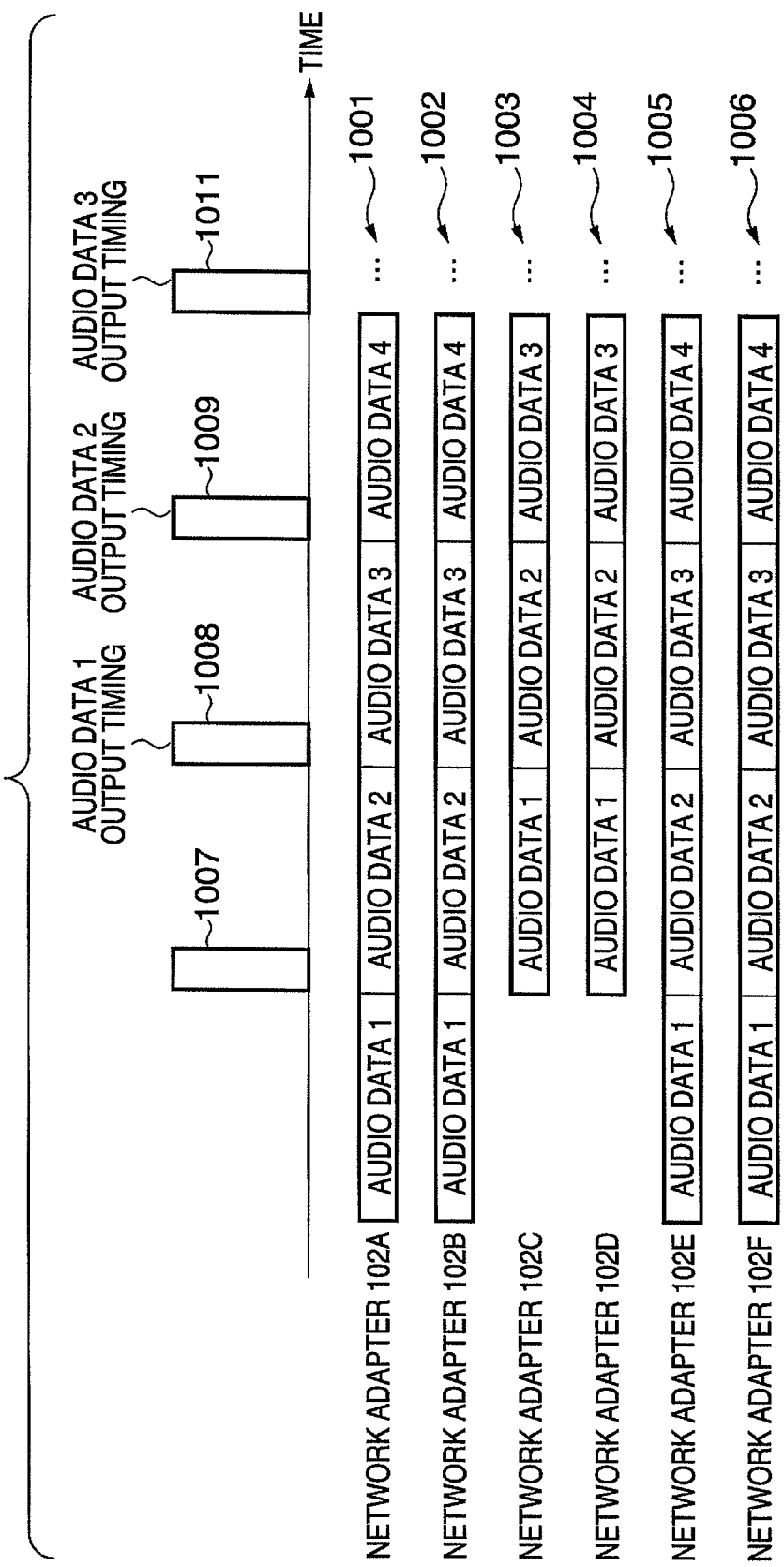
FIG. 10 is a diagram showing sound output timings when a frame delay is corrected.
Figure 11:
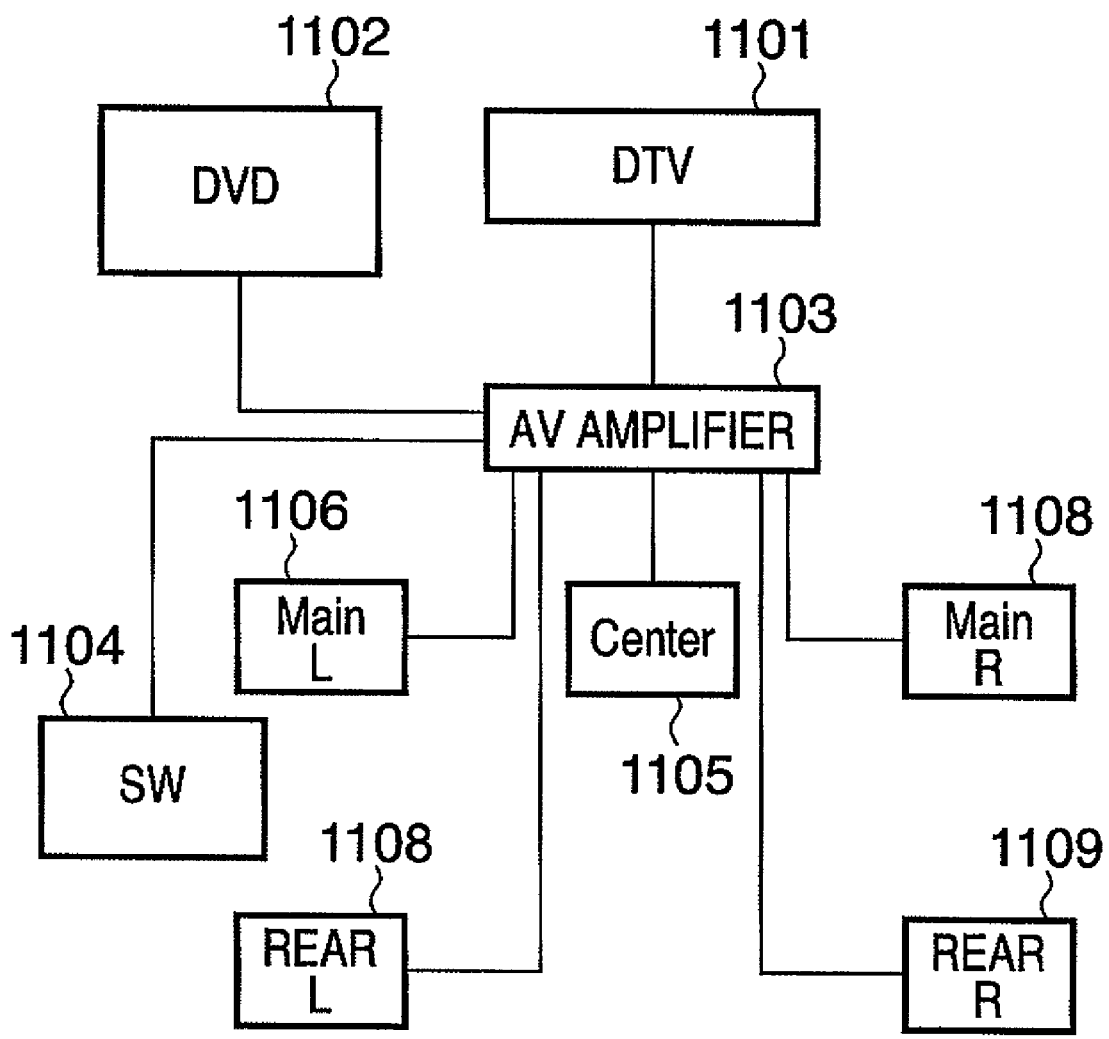
FIG. 11 is a diagram showing an example of a conventional system.

FIG. 10 is a diagram illustrating synchronization of outputs from the network adapters 102A-102F in which delay correction values are set.

Reference numerals 1001 to 1006 denote data frames received at the network adapters 102A-102F, respectively.

Data frames 1003 and 1004 demodulated at the network adapters 102C and 102D have been delayed by one frame as compared with data frames 1001, 1002, 1005, and 1006 demodulated at the network adapters 102A, 102B, 102E, and 102F.

Reference numerals 1007 to 1010 denote a synchronization signal output from the synchronization signal generator 141. The network adapters 102A, 102B, 102E, and 102F, in which a frame delay correction value of 1 is set, buffer demodulated data frames for one synchronization signal cycle, then send their own channel data to a digital amplifier 144 at a timing based on the synchronization signal.

On the other hand, the network adapters 102C and 102D, in which a frame delay correction value of 0 is set, extract their own channel data from data frames they received, then send the data to the digital amplifier 144 at a timing based on the synchronization signal.

Consequently, the network adapters 102A-102F output audio data 1 at the same time at the timing of synchronization signal 1008. Thus, synchronized output is achieved.

As described above, according to the second embodiment, synchronized output can be accomplished using a daisy chain transmission mode with a simple configuration like the first embodiment.

Furthermore, an increase in the load on communication and control processing placed when the audio source is changed can be minimized.

Third Embodiment

A third embodiment differs from the embodiments described above in symbol generation processing and demodulation processing in devices in the network surround sound system shown in FIG. 1.

The third embodiment will be described with respect to a bus data transmission mode. However, the third embodiment is applicable to other data transmission modes as well. Differences from the first embodiment will be described below.

Figure 12:
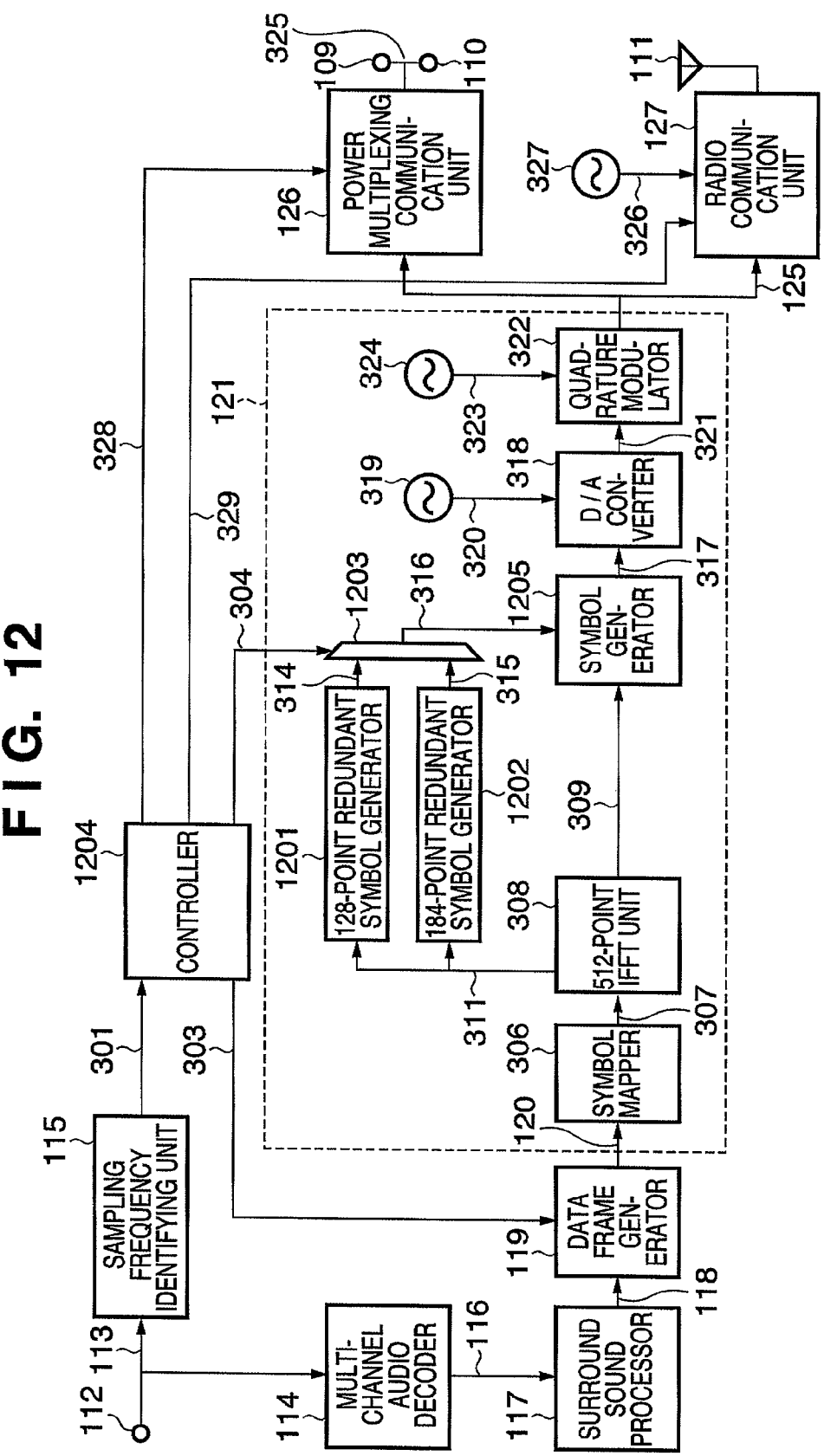
FIG. 12 is a block diagram showing an internal configuration of a multi-speaker controller 101 according to a third embodiment.

FIG. 12 is a functional block diagram showing a detailed configuration of a multi-speaker controller 101.

In FIG. 12, a 128-point redundant symbol generator 1201 and a 184-point redundant symbol generator 1202 copy 128 points and 184 points, respectively, from the forward end of effective symbols. A predetermined number of sample values copied from the forward end of an effective symbol will be referred to as a redundant symbol herein. The 128-point redundant symbol generator 1201 and the 184-point redundant symbol generator 1202 send generated redundant symbols to a redundant symbol selector 1203 through signal lines 314 and 315, respectively.

The redundant symbol selector 1203 sends one of the 128-point redundant symbol and 184-point redundant symbol according to a direction from the controller 1204 to a symbol generator 1205 through a signal line 316.

The symbol generator 1205 appends the redundant symbol selected by the redundant symbol selector 1203 to the back end of the effective symbol to generate an OFDM symbol.

When the sampling frequency of audio data is 44.1 kHz, the controller 1204 directs the redundant symbol selector 1203 to select a 128-point redundant symbol. When the sampling frequency of audio data is 48 kHz, the controller 1204 directs the redundant symbol selector 1203 to select a 184-point redundant symbol.

Figure 13:
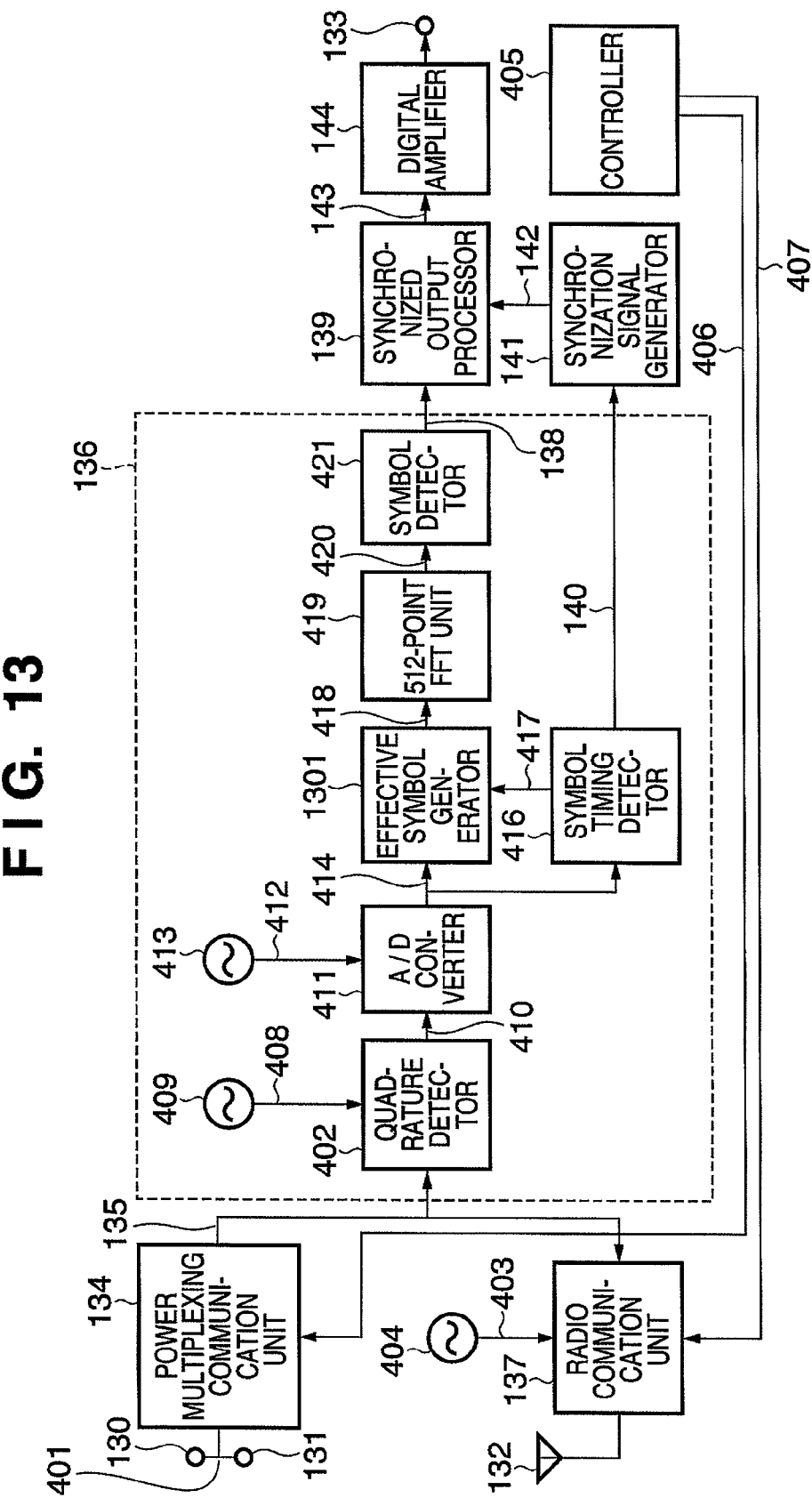
FIG. 13 is a block diagram showing an internal configuration of a speaker adapter 102A-102F according to the third embodiment.

FIG. 13 is a functional block diagram showing a detailed configuration of network adapters 102A-102F.

In FIG. 13, a demodulated symbol generator 1301 generates a symbol to be demodulated from a symbol received and sends it to a 512-point FFT unit 419 through a signal line 418 by processing to be described later.

Synchronized output processing and demodulated symbol generation processing in network adapters 102A-102F will be described with reference to FIGS. 14 and 15. In the third embodiment, intersymbol interference occurs at the forward end of received symbols due to multipath transmission. Therefore, the network adapters 102A-102F should perform processing for removing the forward end of a received symbol and processing for moving a redundant symbol forward to generate a symbol to be demodulated.

FIG. 14 is a diagram illustrating OFDM symbols generated at the multi-speaker controller 101.

Reference numeral 1401 denotes an OFDM symbol generated when the sampling frequency of audio data is 48 kHz and reference numeral 1402 denotes an OFDM symbol generated when the sampling frequency of audio data is 44.1 kHz.

The OFDM symbol 1401 consists of a 512-point effective symbol and a 128-point redundant symbol and the OFDM symbol 1402 consists of 512-point effective symbol and a 184-point redundant symbol.

The OFDM symbols 1401 and 1402 are converted by the D/A converter 318 of the multi-speaker controller 101 to a continuous-time signal at a D/A conversion frequency of 30.7 MHz (32.6 nsec period). Accordingly, the time lengths of OFDM symbols 501 and 502 are 20.85 μsec (32.6 nsec*640 points) and 22.67 μsec (32.6 nsec*696 points). By making the length of the effective signal fixed and the length of the redundant symbol variable in this way, the time length of the OFDM symbol can be made equal to the sampling period of audio data.

OFDM symbols 1401 and 1402 generated in the third embodiment are sample value streams copied from the forward ends of effective symbols to the back ends and therefore the forward and back ends are strongly correlated with each other. Accordingly, detection of a symbol timing and synchronized output processing using a symbol timing signal can be accomplished as in the case where GIs are added to generate OFDM symbols (the first embodiment).

Figure 15:
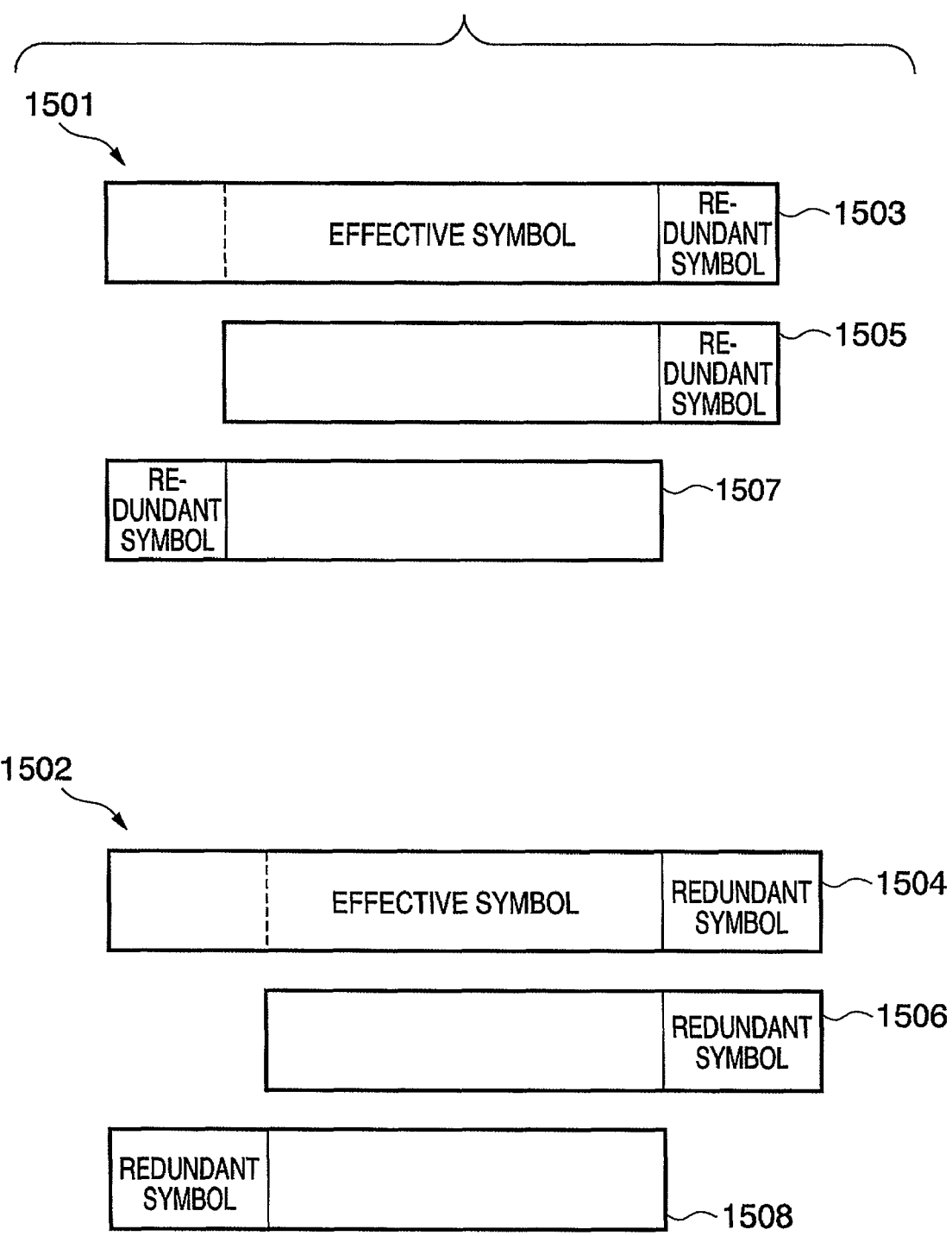
FIG. 15 is a diagram showing processing for generating a demodulated symbol according to the third embodiment.

FIG. 15 illustrates demodulated symbol generation processing by the demodulated symbol generator 1301.

Part 1501 in FIG. 15 illustrates demodulated symbol generation processing performed when OFDM symbol 1401 has been received. Part 1502 illustrates demodulated symbol generation processing performed when OFDM symbol 1402 has been received. In the third embodiment, the copied sample value string in the forward end of an effective symbol for generating a redundant symbol is removed as a portion corresponding to a GI and a redundant symbol is moved to that portion to generate a demodulated symbol.

Reference numerals 1503 and 1504 denote one OFDM symbol separated by symbol timing detection.

Reference numerals 1505 and 1506 denote a symbol generated by removing the copied sample value string in the forward end for generating a redundant symbol.

Reference numerals 1507 and 1508 denote a demodulated symbol generated by moving the redundant symbols to the forward end. The demodulated symbol is the same as the effective symbol.

By the demodulated symbol generation processing described above, demodulated symbol generation in which the influence of multipath transmission is minimized can be accomplished, as with the first embodiment.

Thus, like the first and second embodiments described earlier, the third embodiment eliminates the need for signal transmitting and receiving circuits dedicated to synchronization. In addition, an increase in the load on communication and control processing placed when the audio source is changed can be minimized.

Fourth Embodiment

As a fourth embodiment, a 5.1-channel audio system shown in FIG. 17 will be described.

The system shown in FIG. 17 includes a player 1700, a multi-speaker controller 1710, network adapters 1720-1725, and speakers 1731-1735.

The player 1700 reads multi-channel audio data from a recording medium, such as an optical disk, on which audio data is recorded. The player 1700 then outputs multi-channel audio data containing data for synchronization of reproduction, such as S/PDIF (Sony Philips Digital Interface), to the outside. The player 1700 outputs audio data of multiple sampling frequencies such as 44.1 kHz, 48 kHz, 96 kHz, and 192 kHz according to recording media and formats.

The multi-speaker controller 1710 sends audio data input from the player 1700 to the network adapters 1720-1725.

The network adapters 1720-1725 receive audio data sent from the multi-speaker controller 1710 and outputs data to the speakers 1730-1735, respectively, connected to the adapters.

The speakers 1730-1735 output signals provided from their respective network adapters 1720-1725 connected to the speakers as sound.

Audio channels are assigned to the network adapters 1720-1725 that are associated with their respective speakers 1730-1735. The network adapter 1702 is assigned a center (C) channel and the network adapter 1721 is assigned a sub woofer (SW) channel. The network adapter 1722 is assigned a front right (FR) channel and the network adapter 1723 is assigned a rear right (RR) channel. The network adapter 1724 is assigned a rear left (RL) channel and the network adapter 1725 is assigned a front left (FL) channel.

The player 1700 and the multi-speaker controller 1710 are interconnected through an audio cable such as an S/PDIF cable. The multi-speaker controller 1710 and the network adapters 1721-1725 are interconnected through cables in a daisy chain mode.

Audio data sent from the multi-speaker controller 1710 is received by a network adapter 1720 and is then sent from the network adapter 1720 to a network adapter 1721. The audio data received by the network adapter 1721 is sent to network adapter 1722. In this way, audio data output from the player 1700 is transmitted from the multi-speaker controller 1710 to the network adapters 1720-1725 in order.

Figure 16:
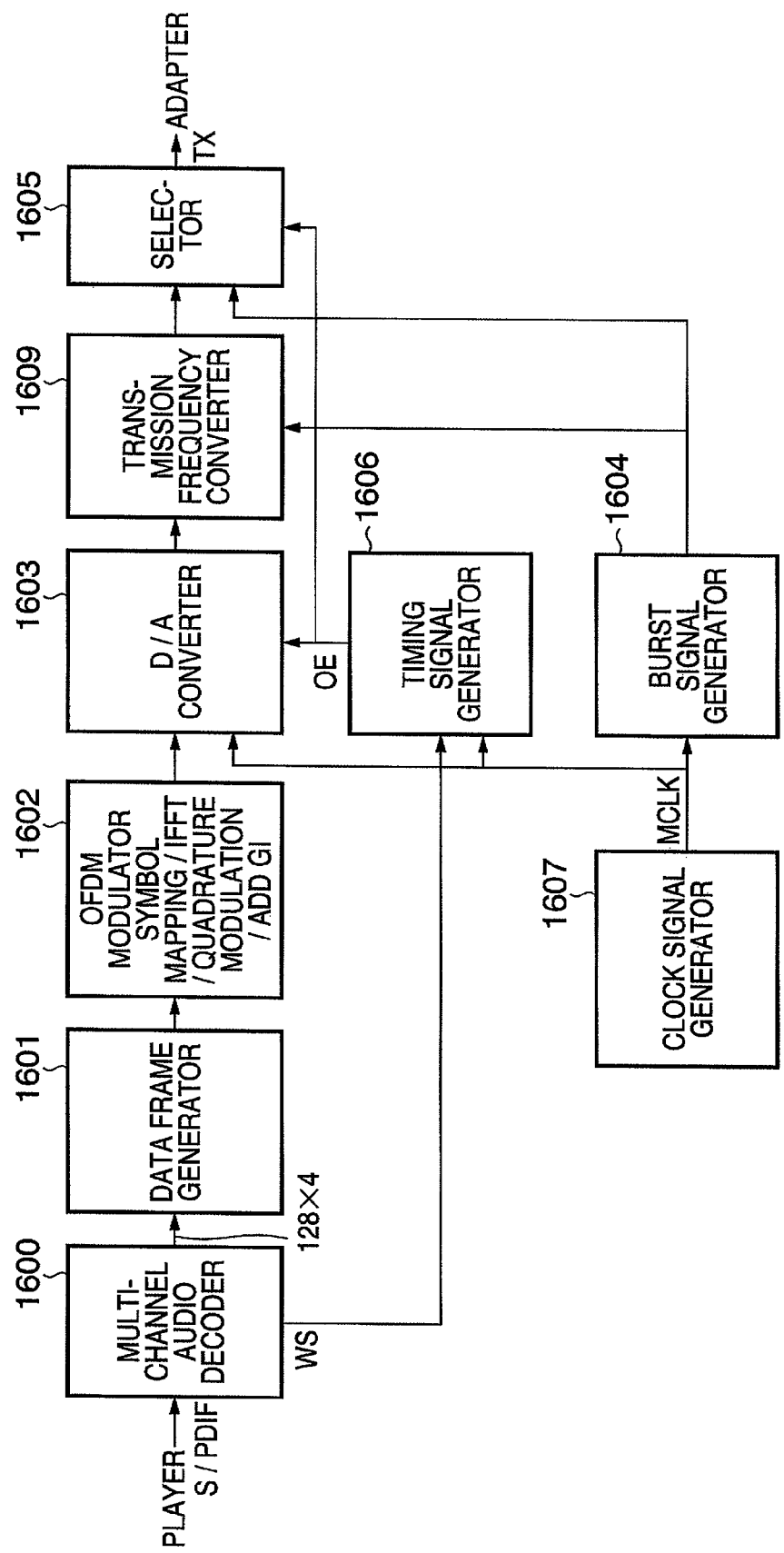
FIG. 16 is a block diagram of a multi-speaker controller 1710 according to a fourth embodiment.
Figure 18:
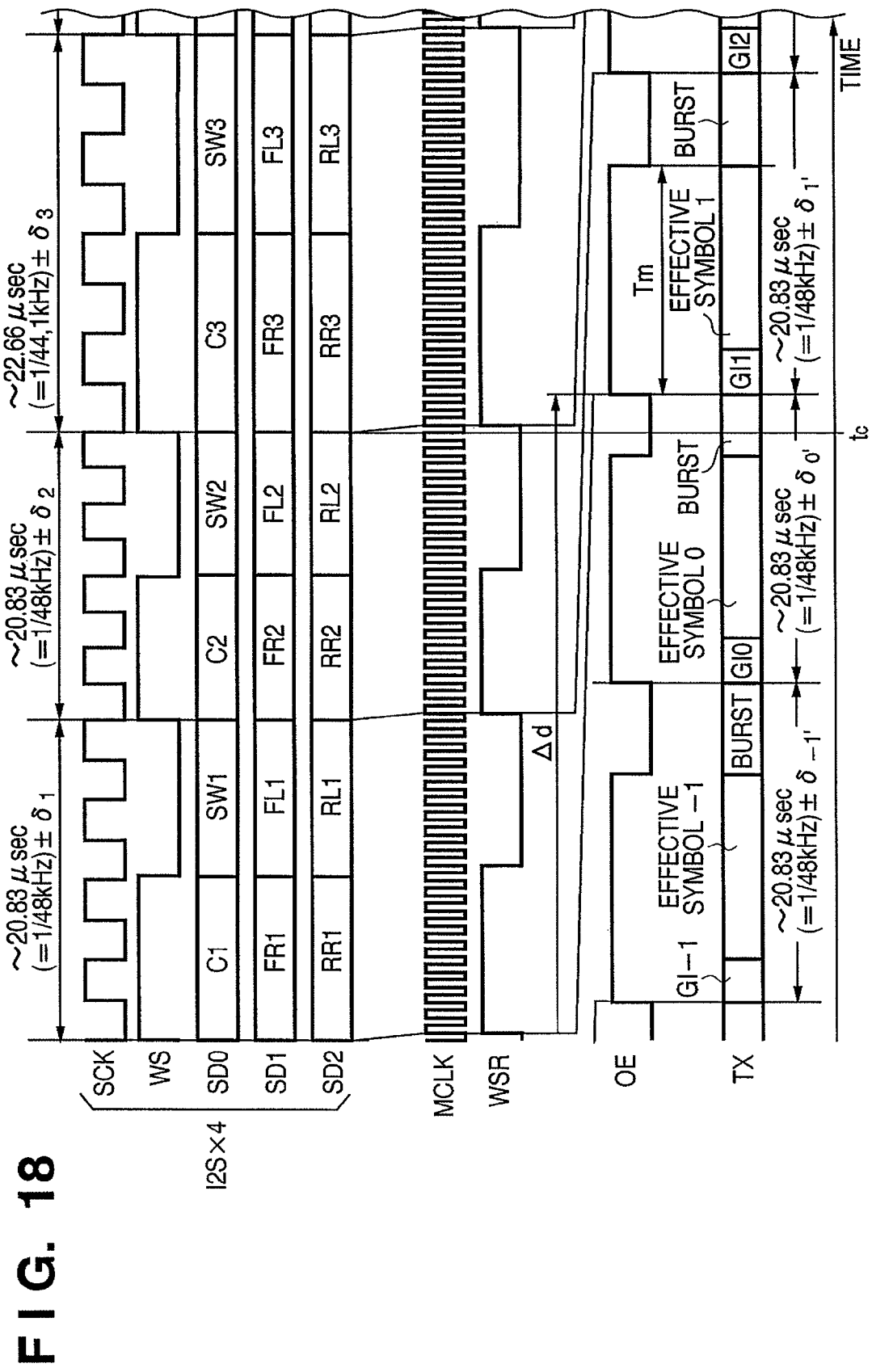
FIG. 18 is a timing chart of input/output signals and internal signals of the multi-speaker controller 1710 according to the fourth embodiment.

A configuration and operation of the multi-speaker controller 1710 will be described with reference to FIGS. 16 and 18. FIG. 16 is a block diagram of the multi-speaker controller 1710 and FIG. 18 is a timing chart of input/output signals and internal signals of the multi-speaker controller 1710.

Reference numeral 1600 denotes a multi-channel audio decoder. The multi-channel audio decoder 1600 decodes multi-channel audio data including data for synchronization of reproduction, such as S/PDIF, output from the player 1700 to generate a reproduction synchronization signal and audio data in a pulse code modulation (PCM) format for each channel. The reproduction synchronization signal is generated from the data for synchronization of reproduction (preamble in the case of S/PDIF) output from the player 1700 and has a period equal to the sampling period of the audio data. Accordingly, when audio data output from the player 1700 changes and therefore the audio data sampling frequency changes, the period of the reproduction synchronization signal also changes.

The multi-channel audio decoder 1600 outputs generated audio data in PCM format for each channel to a data frame generator 1601, one sample point in one period of the reproduction synchronization signal, along with the reproduction synchronization signal. The reproduction synchronization signal is also output to a timing signal generator 1606.

I2SX4 which is similar interface to I2S is used as an output interface of the multi-channel audio decoder 1600. I2SX4 in FIG. 18 denotes a signal output from the multi-channel audio decoder 1600. SCK denotes a serial clock which corresponds to SCK of I2S. WS denotes a word select signal which corresponds to WS of I2S. WS represents the reproduction synchronization signal.

SD0 to SD2 represent serial data which correspond to SD of I2S. Data of the C channel and SW channel are output in SD0, data of the FR channel and FL channel are output in SD1, and data of the RR channel and the RL channel are output in SD2. Shown in FIG. 18 is a change of the sampling frequency of audio data output from the player 1700 from 48 kHz to 44.1 kHz at time tc.

It should be noted here that a temporal fluctuation of the output of the reproduction synchronization data causes a fluctuation of the period of the reproduction synchronization signal because the reproduction synchronization signal is generated from the reproduction synchronization data in multi-channel audio data output from the player 1700. Fluctuations of the reproduction synchronization signal are represented by $\delta i$ (where i is an integer) in FIG. 18.

Figure 19:
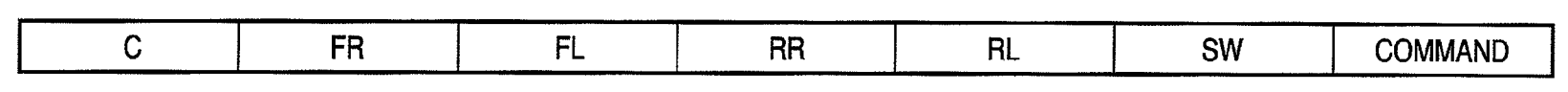

Reference numeral 1601 denotes the data frame generator. The data frame generator 1601 generates a data frame having a configuration as shown in FIG. 19 from the I2SX4 signal input from the multi-channel audio decoder 1600 in each WS signal period. Fields denoted by C, FR, FL, RR, RL, and SW in FIG. 19 are data fields of the C channel, FR channel, FL channel, RR channel, RL channel, and SW channel, respectively. Contained in the field labeled "Command" is a command for network adapters 1720-1725. The data frame generator 1601 outputs the generated data frame to an OFDM modulator 1602.

Reference numeral 1602 denotes the OFDM modulator. The OFDM modulator 1602 OFDM-modulates a data frame input from the data frame generator 1601 to generate OFDM symbol data including an effective symbol unit and a GI unit. Here, the OFDM modulator 1602 generates one piece of OFDM symbol data from one data frame. The OFDM modulator 1602 outputs the generated OFDM symbol data to a D/A converter 1603.

Reference numeral 1603 denotes the D/A converter. The D/A converter 1603 operates in synchronization with a clock signal (MCLK) output from a clock signal generator 1607. The D/A converter 1603 converts digital OFDM symbol data input from the OFDM modulator 1602 to analog data when an output enable signal (OE) output from the timing signal generator 1606 is high (H). In this case, the D/A converter 1603 performs digital-to-analog-conversion to OFDM symbol data while the OE signal is high. Thus, the D/A converter 1603 generates an intermediate frequency OFDM signal and outputs it to a transmission frequency converter 1609.

Reference numeral 1604 denotes a burst signal generator. The burst signal generator 1604 operates in synchronization with the MCLK signal output from the clock signal generator 1607. The burst signal generator 1604 divides the frequency of the MCLK signal output from the clock signal generator 1607 and then filters to generate a sinusoidal signal (hereinafter referred to as the burst signal) having a frequency equal to a carrier frequency. The burst signal generator 1604 then outputs the generated burst signal to the transmission frequency converter 1609 and a selector 1605.

Reference numeral 1605 denotes the selector. The selector 1605 outputs a carrier frequency OFDM signal provided from the transmission frequency converter 1609 onto a transmission path to the network adapter 1720 when the OE signal output from the timing signal generator 1606 is high. On the other hand, when the OE signal output from the timing signal generator 1606 is low (L), the selector 1605 outputs a burst signal provided from the burst signal generator 1604 onto a transmission path to the network adapter 1720.

Reference numeral 1606 denotes the timing signal generator. The timing signal generator 1606 operates in synchronization with the MCLK signal output from the clock signal generator 1607. The timing signal generator 1606 reclocks a WS signal output from the multi-channel audio decoder 1600 by using the MCLK signal output from the clock signal generator 1607 to generate a WSR signal.

The timing signal generator 1606 generates an OE signal that rises after a predetermined period of time ($\Delta d$) has elapsed since the rise of the WSR signal and falls after a period of time equivalent to the OFDM symbol length (Ts) has elapsed and outputs the OE signal to the D/A converter 1603 and the selector 1605. Here, $\Delta d$ is chosen such that audio data output from the multi-channel audio decoder 1600 in a certain WS signal period can be output as a transmission (TX) signal in a period of the WSR signal corresponding to that WS signal. Accordingly, $\Delta d$ has at least a length equal to the period of time between the start of output of audio data from the multi-channel audio decoder 1600 and the input of the audio data into the D/A converter 1603.

When the suffix i of Ci, SWi, FRi, FLi, RRi, and Rli (where i is an integer) of the signals SD0, SD1, and SD2 matches the suffix j of GIj and effective symbol j (where j is an integer) of the signal TX in FIG. 18, it indicates that they are data or signals based on the same audio data. For example, C1, SW1, FR1, FL1, RR1, and RL1 of signals SD0, SD1, and SD2 are output as GI1 and effective symbol 1 of the TX signal.

Data or signals based on the same audio data in the drawings described below are likewise labeled using the suffixes.

Reference numeral 1607 denotes the clock signal generator. The clock signal generator 1607 generates an MCLK signal and outputs it to the D/A converter 1603, the burst signal generator 1604, and the timing signal generator 1606. The MCLK signal is a clock signal generated from a clock source independent of the clock source of the player 1700 and has an adequately low jitter for use in an OFDM modulation and demodulation system.

The clock source of the multi-speaker controller 1710 is practically the player 1700 in processing relating to reception from the player 1700. In processing relating to transmission to the network adapter 1720, the multi-speaker controller 1710 uses an internally generated clock independent of the player 1700. Consequently, there is a frequency deviation between these clocks, which fluctuates the period of WSR signal even if the period of the WS signal does not fluctuate.

Reference numeral 1609 denotes the transmission frequency converter. The transmission frequency converter 1609 uses a burst signal output from the burst signal generator 1604 to convert an intermediate frequency OFDM signal output from the D/A converter 1603 to generate a carrier frequency OFDM signal. The transmission frequency converter 1609 outputs the generated carrier frequency OFDM signal to the selector 1605.

Figure 20:
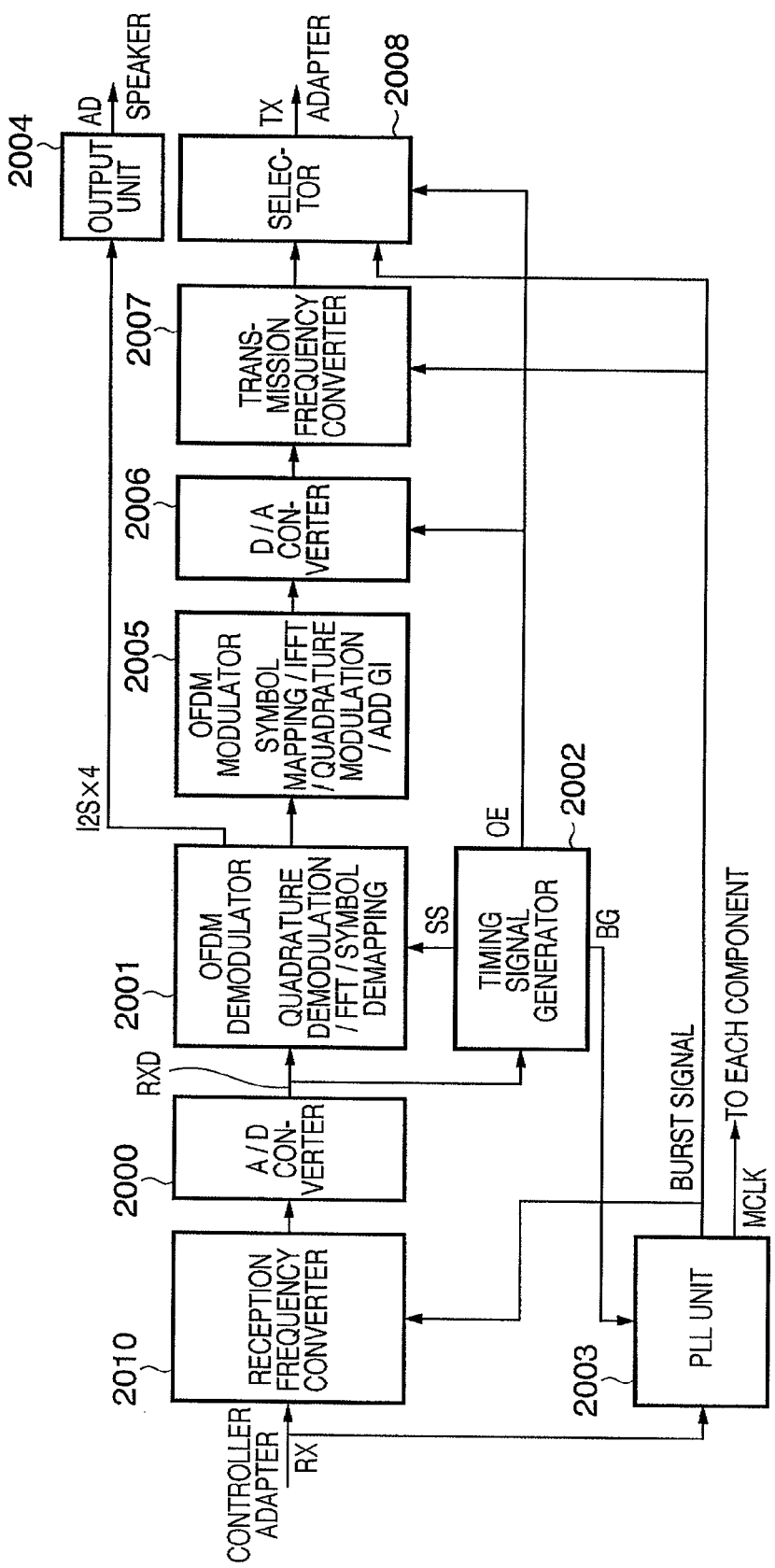
FIG. 20 is a block diagram of a network adapter 1720-1725 according to the fourth embodiment.

As a result of the operations of the components described above, the transmission signal (TX) to the network adapter 1720 becomes a signal having a frame period approximately equal to the period of the WS signal that practically synchronizes with the clock of the player 1700, including a fluctuation of the period. A frame consists of an OFDM signal unit (including a GI unit and an effective symbol) having a fixed length and a burst signal unit whose length changes according to the period and fluctuations of the period of the WS signal or the WSR signal. A configuration and operation of the network adapters 1720-1725 will be described with reference to FIGS. 20 and 21. FIG. 20 is a block diagram of a network adapter 1720-1725 and FIG. 21 is a timing chart of input and output signals and internal signals of the network adapter 1720-1725.

Reference numeral 2000 denotes an A/D converter. The A/D converter 2000 converts an analog intermediate frequency reception signal output from a reception frequency converter 2010 into a digital reception signal (RXD) and outputs it to an OFDM demodulator 2001 and a timing signal generator 2002.

Reference numeral 2001 denotes the OFDM demodulator. The OFDM demodulator 2001 uses a symbol synchronization signal (SS) output from a timing signal generator 2002 to obtain symbol synchronization, OFDM-demodulates an RXD signal input from the A/D converter 2000 to obtain a data frame (FIG. 19). The OFDM demodulator 2001 outputs the data frame obtained to an output unit 2004 along with a reproduction synchronization signal. I2SX4 which is similar to I2S is used for the output interface to the output unit 2004 like the output interface of the multi-channel audio decoder 1600 of the multi-speaker controller 1710.

Figure 21:
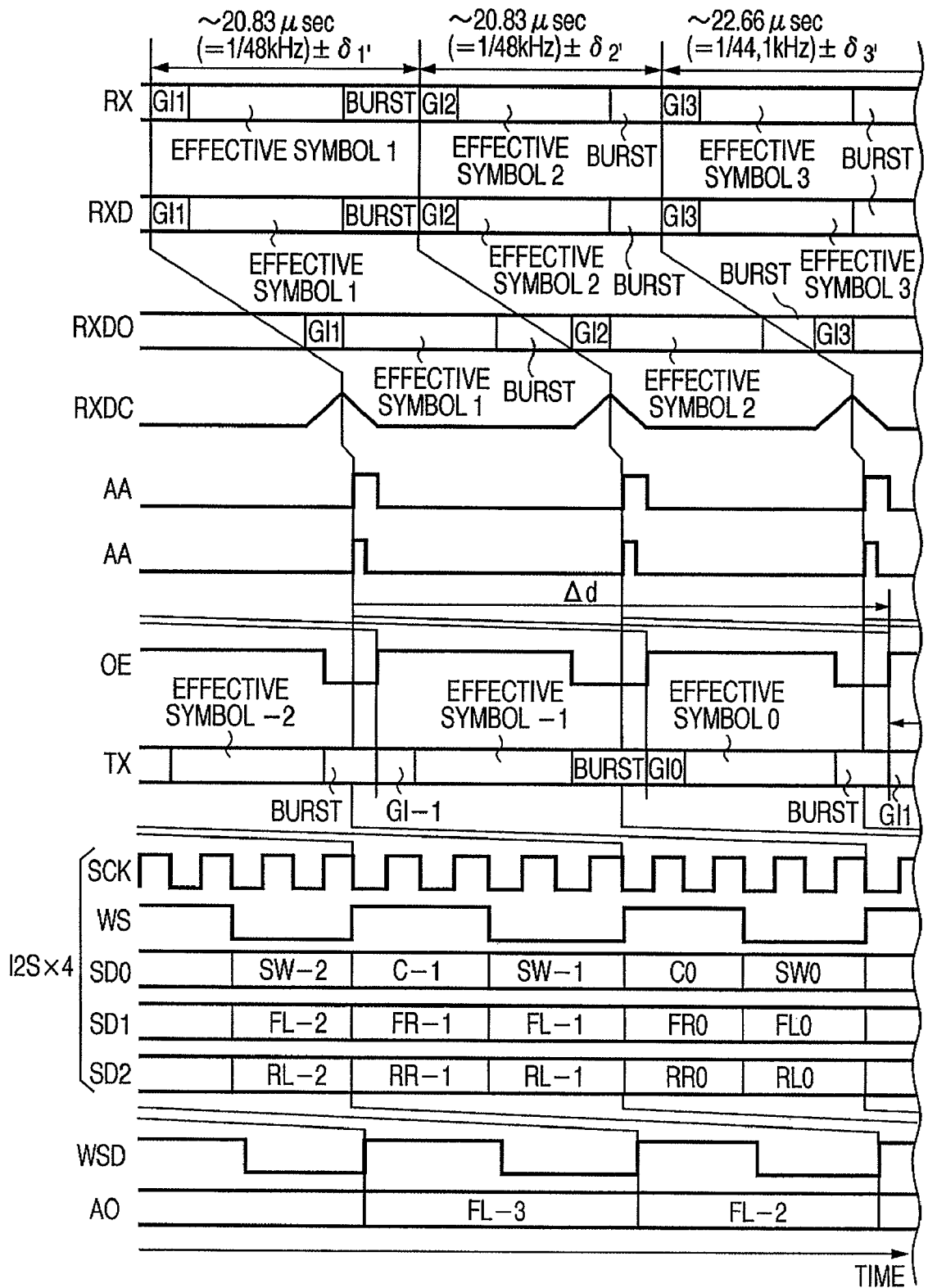
FIG. 21 is a timing chart of input/output signals and internal signals of the network adapter 1720-1725 according to the fourth embodiment.

I2SX4 in FIG. 21 is an output signal output from the OFDM demodulator 2001 to the output unit 2004. Here, the WS signal acts as a reproduction synchronization signal. The WS signal is generated from the SS signal output from the timing signal generator 2002 and has the same period as that of the SS signal, including a fluctuation of the period. The OFDM demodulator 2001 outputs audio data it received in a certain frame of an RX signal in a period of the WS signal corresponding to that frame. For example, GI1 and effective symbol 1 of the RX signal are output as C1, SW1, FR1, FL1, RR1, and RL1 of the signals SD0, SD1, and SD2. The I2SX4 signal output from the multi-channel audio decoder 1600 of the multi-speaker controller 1710 is reproduced as an output signal of the OFDM demodulator 2001. The OFDM demodulator 2001 outputs the data frame it obtained to an OFDM modulator 2005 as well.

Reference numeral 2002 denotes the timing signal generator. The timing signal generator 2002 generates a burst gate signal (BG), an SS signal, and an output enable signal (OE) based on the RXD signal output from the A/D converter 2000. The timing signal generator 2002 outputs them to a PLL unit 2003, OFDM demodulator 2001, D/A converter 2006, and selector 2008.

The SS signal can be generated based on a correlation signal (RXDC) between an RX signal and a signal (RXDD) that is the RX signal delayed by an effective symbol length, as widely known as a method for synchronizing symbols in an OFDM modulation and demodulation system. The SS signal rises upon detection of a peak of the RXDC signal and falls one clock after that.

Similarly, the BG and OE signals can be generated based on the RXDC signal. The BG signal rises upon detection of a peak of the RXDC signal, remains high for a period of time H shorter than or equal to a predetermined minimum burst signal length, and then falls. The minimum burst signal length can be determined based on the minimum sampling period of audio data output from the player 1700 and the magnitude of temporal fluctuations of the output of reproduction synchronization data.

The OE signal rises after a predetermined period of time (Δd) has elapsed since the detection of a peak of the RXDC signal and falls after a period of time equivalent to the OFDM symbol length (Ts) has elapsed. The period of time Δd is determined such that audio data received in a certain frame of the RX signal can be output as a TX signal in a frame of a period corresponding to that frame. Accordingly, Δd has at least a length equivalent to a period of time between completion of OFDM demodulation of the RXD signal at the OFDM demodulator 2001 and input of the demodulated RXD signal into the D/A converter 2006. For example, GI1 and effective symbol 1 of the RX signal are output as GI1 and effective signal 1 of the TX signal.

Reference numeral 2003 denotes the PLL unit. The PLL unit 2003 extracts a burst signal from an RX signal output from the multi-speaker controller 1710 or a network adapter connected upstream by using a BG signal output from the timing signal generator 2002 as a window signal. The PLL unit 2003 uses a phase lock loop (PLL) to generate continuous burst signals whose phase is in synchronization with the PLL. The PLL unit 2003 outputs the generated burst signals to the reception frequency converter 2010, a transmission frequency converter 2007, and a selector 2008. The PLL unit 2003 multiplies the generated burst signal to generate a clock signal (MCLK). The PLL unit 2003 provides the generated MCLK signal to components of the network adapters. The components of the network adapters operate in synchronization with the MCLK signal. That is, the network adapters 1720-1725 use the burst signal for synchronization of their operation clocks and synchronization of frequencies relating to OFDM modulation and demodulation (carrier frequency synchronization and sampling frequency synchronization).

Reference numeral 2004 denotes the output unit. The output unit 2004 extracts audio data of its own channel from an I2SX4 signal input from the OFDM demodulator 2001. The output unit 2004 delays a WS signal in accordance with the network adapter at which data arrives latest to generate a WSD signal so that proper sound can be provided. The output unit 2004 converts digital audio data of its own channel to analog audio data at the rising edge of the WSD signal, then amplifies the data to generate audio signal (AO), and outputs the AO signal to the speaker. FIG. 21 shows an example in which data of the FL channel is extracted and is output as an AO signal.

Reference numeral 2005 denotes the OFDM modulator. The OFDM modulator 2005 OFDM-modulates a data frame input from the OFDM demodulator 2001 to generate OFDM symbol data including an effective symbol unit and a GI unit. Here, the OFDM modulator 2005 generates one piece of OFDM symbol data from one data frame. The OFDM modulator 2005 outputs the generated OFDM symbol data to the D/A converter 2006.

Reference numeral 2006 denotes the D/A converter. The D/A converter 2006 converts digital OFDM symbol data input from the OFDM modulator 2005 to an analog intermediate frequency OFDM signal and outputs it to the transmission frequency converter 2007 when the OE signal output from the timing signal generator 2002 is high. In this case, the D/A converter 2006 performs digital-to-analog-conversion to OFDM symbol data while the OE signal is high.

Reference numeral 2007 denotes the transmission frequency converter. The transmission frequency converter 2007 uses a burst signal output from the PLL unit 2003 to convert the intermediate frequency OFDM signal output from the D/A converter 2006 to a carrier frequency, thereby generating a carrier frequency OFDM signal. The transmission frequency converter 2007 outputs the generated carrier frequency OFDM signal to the selector 2008.

Reference numeral 2008 denotes the selector. The selector 2008 outputs a carrier frequency OFDM signal provided from the transmission frequency converter 2007 onto the transmission path when the OE signal output from the timing signal generator 2002 is high. On the other hand, the selector 2008 outputs a burst signal output from the PLL unit 2003 onto the transmission path to the network adapter connected downstream when the OE signal output from the timing signal generator 2002 is low.

Reference numeral 2010 denotes the reception frequency converter. The reception frequency converter 2010 receives a reception signal (RX) output from the multi-speaker controller 1710 or the network adapter connected upstream and converts the RX signal to an intermediate frequency by using a burst signal output from the PLL unit 2003 to generate an intermediate frequency reception signal. The reception frequency converter 2010 outputs the generated intermediate frequency reception signal to the A/D converter 2000.

As a result of the operations of the components described above, the transmission signal (TX) to the network adapter connected downstream becomes a signal having a frame period equal to that of the reception signal received from the multi-speaker controller 1710 or the network adapter connected upstream, including a fluctuation of the period. In the present embodiment, multi-channel audio data output from the player 1700 or an output signal from the multi-channel audio decoder 1600 of the multi-speaker controller 1710 corresponds to data input in multiple input periods. The reception signals at the network adapters 1730-1735 and output signals from the OFDM demodulator 2001 and the timing signal generator 2002 of the network adapters 1730-1735 also correspond to data input in multiple input periods.

While the multi-speaker controller 1710 in the embodiment described above sends data of one period of the WS signal in one frame, the multi-speaker controller 1710 may send data of multiple periods of the WS signal in one frame. In that case, the length of a burst signal unit is changed in accordance with the length of the multiple periods at each of the multiple WS signal periods so that the frame period can be made approximately equal to the multiple periods of the WS signal, including fluctuations of the periods. The period of the WS signal output from the OFDM demodulator 2001 of the network adapters 1730-1735 may be chosen to be the average period of the multiple WS signal periods.

Data of one WS signal period may be sent in multiple frames. In that case, the length of a burst signal unit of at least one of the multiple frames that convey data of one WS signal period is changed in each WS signal period according to the length of the period of the WS signal so that the length of the period of the multiple frames can be made approximately equal to the period of the WS signal, including fluctuations of the length. Thus, the period of the WS signal output from the OFDM demodulator 2001 of the network adapters 1730-1735 can be made approximately equal to the period of the WS signal before transmission.

While the period of the WS signal is equal to the sampling period of audio data in the embodiment described above, the period of the WS signal may longer or shorter than the sampling period of audio data by a factor of n (where n is a positive integer). In that case, the output unit 2004 of the network adapters 1730-1735 performs processing for outputting an audio signal according to the output format of the audio decoder 1600 of the player 1700. For example, if the period of the WS signal is n times longer than the sampling period of audio data, an audio signal is output in synchronization with the WS signal multiplied by n. On the other hand, if the period of the WS signal is one n-th of the sampling period of audio data, an audio signal which is synchronized with the WS signal in n periods is output.

Signals such as I2SX4, TX, and RX signals are shown being continuous without interruptions even when the sampling frequency of audio data output from the player 1700 changes in the drawings used in the description of the present embodiment. However, when the sampling frequency of audio data output from the player 1700 changes, these signals may be interrupted or discontinuous near the point of the change.

Because a frame includes a burst signal in the present embodiment, the present embodiment is useful for a case where synchronization between operation clocks of a transmitter and a receiver or frequency synchronization relating to modulation and demodulation is required.

Furthermore, because the length of a burst signal unit that does not contain significant data is changed in data transmission in the present embodiment, the present embodiment is useful for a case where it is difficult to change the length of a portion containing significant data between the transmitter and receiver. Therefore, the present embodiment is useful for a case where synchronization of frequencies relating to modulation and demodulation between a transmitter and a receiver is required as with the OFDM modulation and demodulation scheme and where it is difficult to change the length of a portion containing significant data (effective symbol in the case of the OFDM modulation and demodulation scheme). The present embodiment has been described with respect to an example in which audio data is transmitted. However, the present invention is not limited to this; the present invention can be widely applied to transmission of streaming data that requires punctuality, such as video data (including video data that includes audio data) and various kinds of measurement data.

Fifth Embodiment

Another embodiment of the present invention will be described that differs from the fourth embodiment in configurations and operations of the multi-speaker controller 1710 and the network adapters 1720-1725 in the 5.1 channel audio system shown in FIG. 17.

Figure 22:
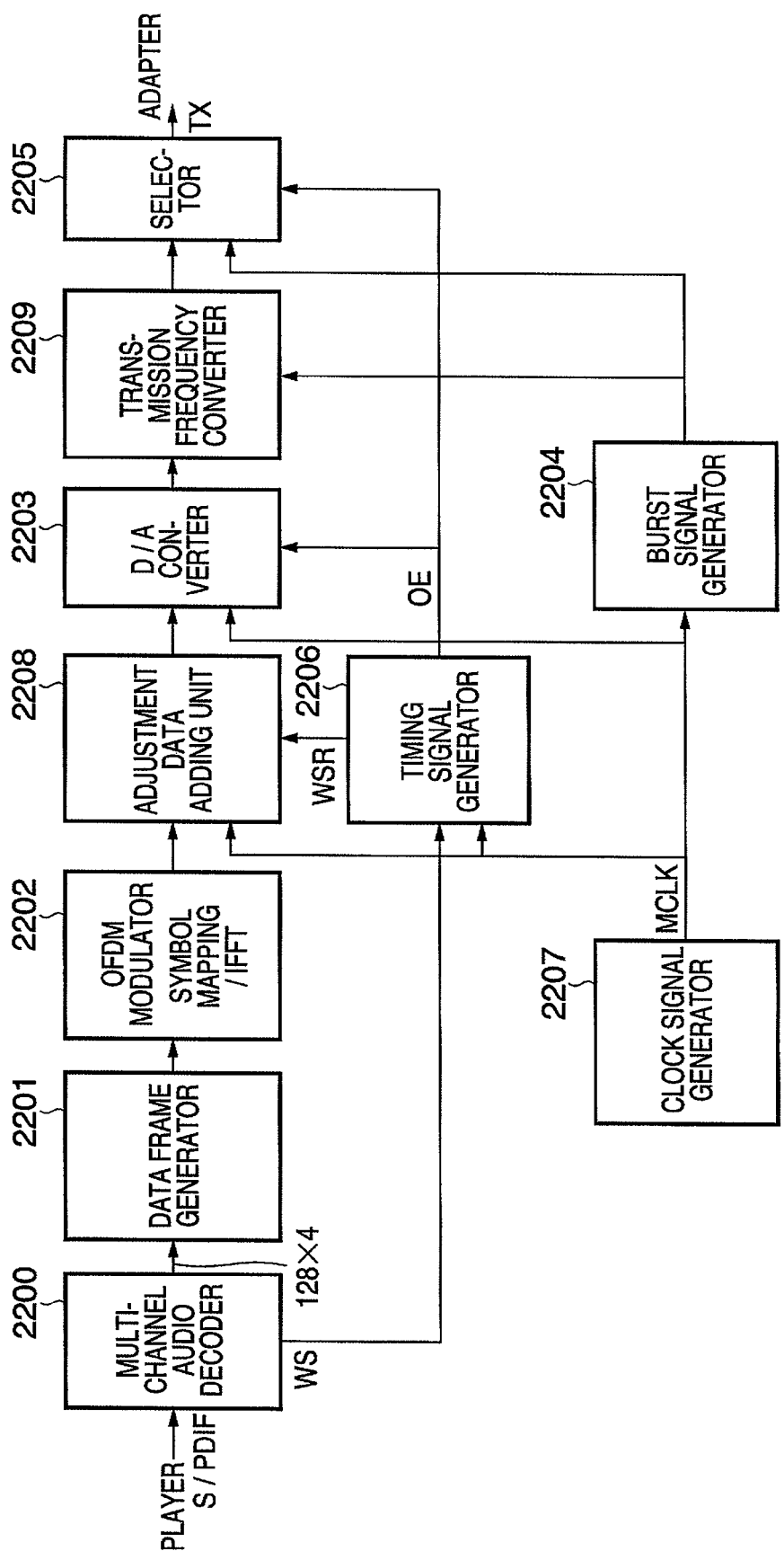
FIG. 22 is a block diagram of a multi-speaker controller 1710 according to a fifth embodiment.
Figure 23:
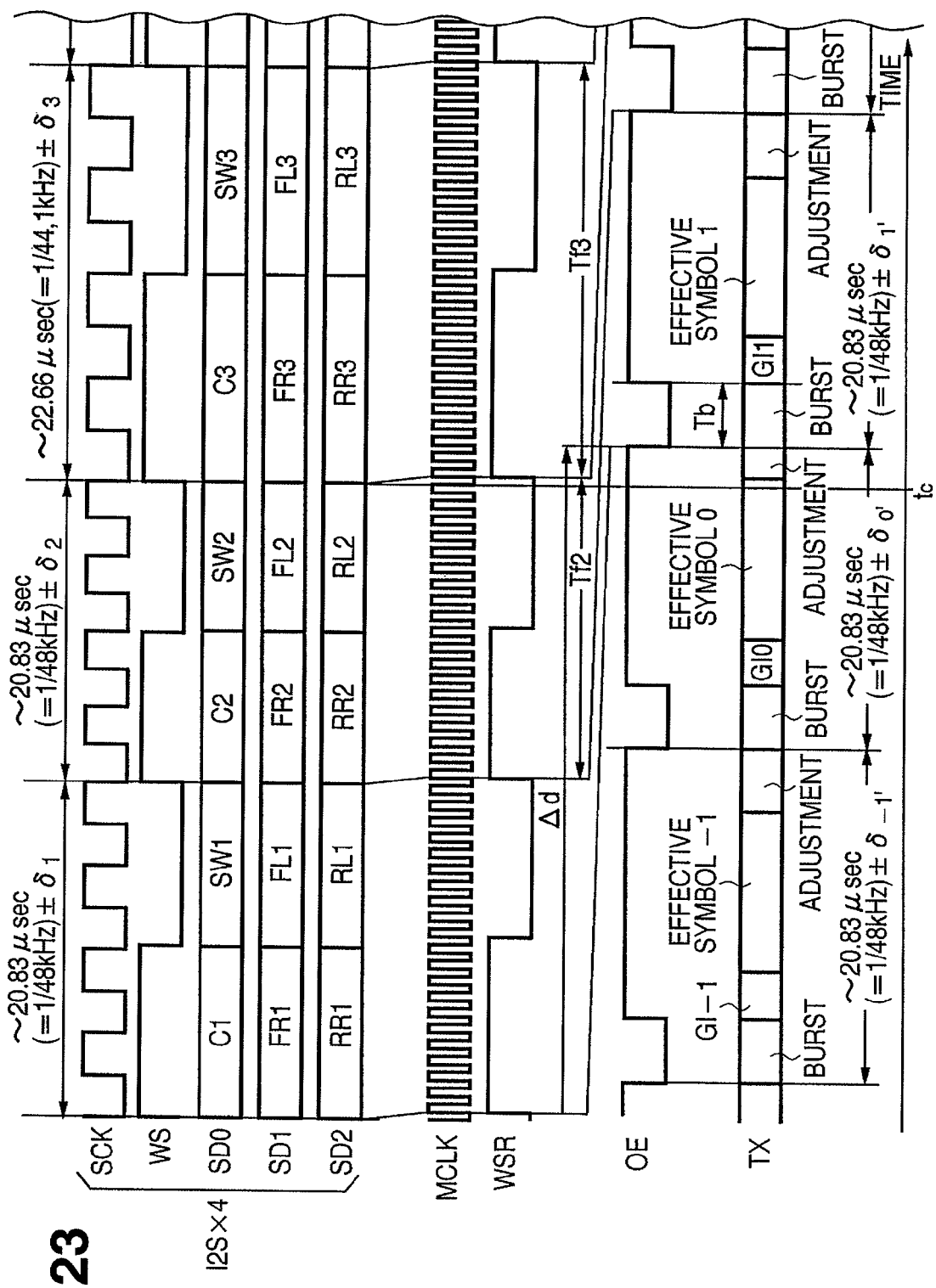
FIG. 23 is a timing chart of input/output signals and internal signals of the multi-speaker controller 1710 according to the fifth embodiment.

A configuration and operation of the multi-speaker controller 1710 will be described with reference to FIGS. 22 and 23. FIG. 22 is a block diagram of the multi-speaker controller 1710 and FIG. 23 is a timing chart of input and output signals and internal signals of the network adapters 1720-1725.

Reference numeral 2200 denotes a multi-channel audio decoder. The multi-channel audio decoder 2200 decodes multi-channel audio data including reproduction synchronization data, such as S/PDIF, output from a player 1700 to generate a reproduction synchronization signal and audio data in a PCM format for each channel. The reproduction synchronization signal is generated from reproduction synchronization data (preamble in the case of S/PDIF) output from the player 1700 and has a period equal to the sampling period of audio data. Accordingly, when audio data output from the player 1700 has changed and, as a result, the sampling frequency of the audio data has changed, the period of the reproduction synchronization signal also changes. The multi-channel audio decoder 2200 outputs the generated audio data in the PCM format for each channel to a data frame generator 2201 along with the reproduction synchronization signal, one sample point in each period of the reproduction synchronization signal. The reproduction synchronization signal is also output to a timing signal generator 2206.

I2SX4 which is similar to I2S is used as the output interface of the multi-channel audio decoder 2200. I2SX4 in FIG. 18 is a signal output from the multi-channel audio decoder 2200. SCK is a serial clock and corresponds to SCK of I2S. WS is a word select signal and corresponds to WS of I2S, which represents the reproduction synchronization signal.

Each of SD0 to SD2 represents serial data which correspond to SD of I2S. Data of the C channel and SW channel are output in SD0, data of the FR channel and FL channel are output in SD1, and data of the RR channel and the RL channel are output in SD2. Shown in FIG. 23 is a change of the sampling period of audio data output from the player 1700 from 48 kHz to 44.1 kHz at time tc.

It should be noted here that a temporal fluctuation of the output of the reproduction synchronization data causes a fluctuation of the reproduction synchronization signal because the reproduction synchronization signal is generated from the reproduction synchronization data in multi-channel audio data output from the player 1700. Fluctuations of the reproduction synchronization signal are represented by $\delta i$ (where i is an integer) in FIG. 23.

Reference numeral 2201 denotes the data frame generator. The data frame generator 2201 generates a data frame having a configuration as shown in FIG. 19 from the I2SX4 signal input from the multi-channel audio decoder 2200 in each period of the WS signal. Fields denoted by C, FR, FL, RR, RL, and SW in FIG. 19 are data fields of the C channel, FR channel, FL channel, RR channel, RL channel, and SW channel, respectively. Contained in the field labeled "Command" is a command for network adapters 1720-1725. The data frame generator 2201 outputs the generated data frame to an OFDM modulator 2202.

Reference numeral 2202 denotes the OFDM modulator. The OFDM modulator 2202 OFDM-modulates a data frame input from the data frame generator 2201 to generate OFDM symbol data including an effective symbol unit and a GI unit. Here, the OFDM modulator 2202 generates one piece of OFDM symbol data from one data frame. The OFDM modulator 2202 outputs the generated OFDM symbol data to an adjustment data adding unit 2208.

Reference numeral 2203 denotes a D/A converter. The D/A converter 2203 operates in synchronization with a clock signal (MCLK) output from a clock signal generator 2207. The D/A converter 2203 converts digital data input from the adjustment data adding unit 2208 to analog data and outputs the data to a transmission frequency converter 2209 when an output enable signal (OE) output from the timing signal generator 2206 is high (H). In this case, the D/A converter 2203 performs digital-to-analog-conversion to OFDM symbol data while the OE signal is high.

Reference numeral 2204 denotes a burst signal generator. The burst signal generator 2204 operates in synchronization with the MCLK signal output from the clock signal generator 2207. The burst signal generator 2204 divides the frequency of the MCLK signal output from the clock signal generator 2207 and then filters to generate a burst signal and outputs the burst signal to the transmission frequency converter 2209 and a selector 2205.

Reference numeral 2205 denotes the selector. The selector 2205 outputs a signal provided from the transmission frequency converter 2209 onto the transmission path to the network adapter 1720 when the OE signal output from the timing signal generator 2206 is high. On the other hand, when the OE signal output from the timing signal generator 2206 is low (L), the selector 2205 outputs a burst signal provided from the burst signal generator 2204 onto the transmission path to the network adapter 1720.

Reference numeral 2206 denotes the timing signal generator. The timing signal generator 2206 operates in synchronization with the MCLK signal output from the clock signal generator 2207. The timing signal generator 2206 reclocks a WS signal output from the multi-channel audio decoder 2200 by using the MCLK signal output from a clock signal generator 2207 to generate a WSR signal. The timing signal generator 2206 outputs the generated WSR signal to the adjustment data adding unit 2208.

The timing signal generator 2206 generates an OS signal that falls after a predetermined period of time ($\Delta d$) has elapsed since the rise of the WSR signal and rises after a predetermined burst signal time (Tb) has elapsed and outputs the OE signal to the D/A converter 2203 and the selector 2205. Here, $\Delta d$ is chosen such that audio data output from the multi-channel audio decoder 2200 in a certain WS signal period can be output as a transmission (TX) signal in a period of the WSR signal corresponding to that WS signal. Accordingly, $\Delta d$ has at least a length obtained by subtracting the burst signal length from the period of time between the start of output of audio data from the multi-channel audio decoder 2200 and the input of the audio data into the D/A converter 2203.

When the suffix i of Ci, SWi, FRi, FLi, RRi, RLi (where i is an integer) of the signals SD0, SD1, and SD2 matches the suffix j of GIj and effective symbol j (where j is an integer) of the TX signal in FIG. 23, it indicates that they are data or signals based on the same audio data. For example, C1, SW1, FR1, FL1, RR1, and RL1 of signals SD0, SD1, and SD2 are output as GI1 and effective symbol 1 of the TX signal.

Data or signals based on the same audio data in the drawings described below are labeled likewise using the suffixes.

Reference numeral 2207 denotes the clock signal generator. The clock signal generator 2207 generates an MCLK signal and outputs it to the D/A converter 2203, the burst signal generator 2204, the timing signal generator 2206, and the adjustment data adding unit 2208. The MCLK signal is a clock signal generated from a clock source independent of the clock source of the player 1700 and has an adequately low jitter for use in an OFDM modulation and demodulation system.

The clock source of the multi-speaker controller 1710 is practically the player 1700 in processing relating to reception from the player 1700. In processing relating to transmission to the network adapter 1720, the multi-speaker controller 1710 uses a clock signal internally generated in the multi-speaker controller 1710. Consequently, there is a frequency deviation between these clocks, which fluctuates the period of the WSR signal even if the period of the WS signal does not fluctuate.

Reference numeral 2208 denotes the adjustment data adding unit. The adjustment data adding unit 2208 adds adjustment data having a length according to the period of a WSR signal output from the timing signal generator 2206 and a fluctuation of the period to OFDM symbol data input from the OFDM modulator 2202, and outputs the data to the D/A converter 2203. The adjustment data has a length that depends on an increase or decrease of the period of the WSR signal measured at each rising edge of the WSR signal. For example, the length of the adjustment data is increased by an increase, Tf3-Tf2, of the length of the period of the WSR signal in frame 3 in FIG. 23. As a result, the increase, Tg3-Tg2, becomes equal to Tf3-Tf2. An increase and decrease of the length of the period of the WSR signal is obtained by counting pulses of the MCLK signal output from the clock signal generator 2207 and comparing the count value at the current period with the count value at the previous period. The minimum length of the adjustment data is determined so that the length is greater than or equal to 0 even when the period of the WSR signal reduces to its minimum length.

Figure 24:
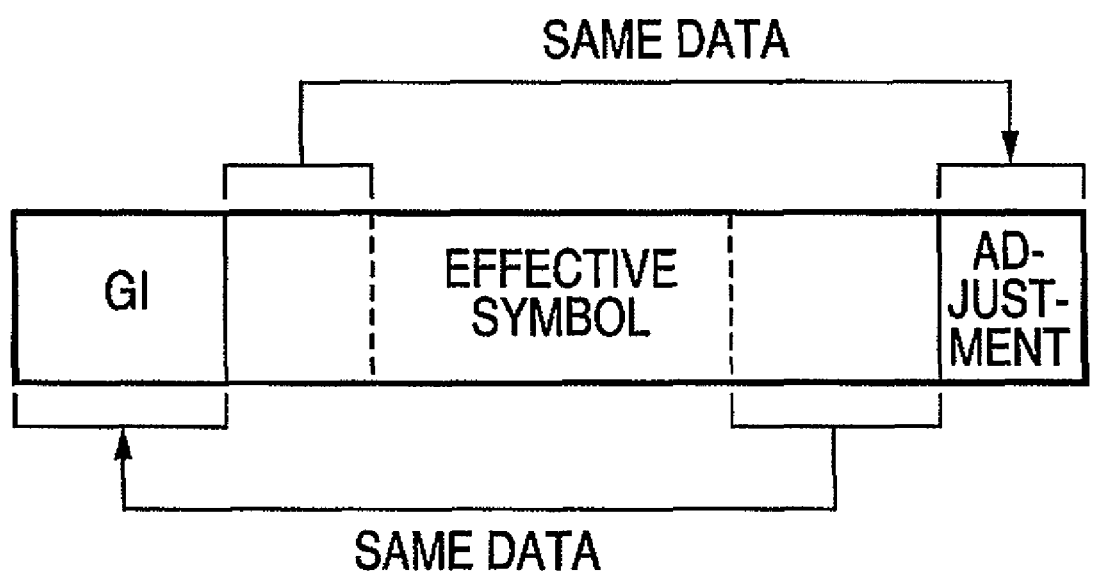
FIG. 24 is a diagram illustrating adjustment data.

Appending the same data as the data at the forward of an effective symbol to the backward of the effective symbol (FIG. 24) will effectively reduce the rate of error in demodulation due to a symbol synchronization error during OFDM demodulation. It is assumed in the present embodiment that the same data as that at the forward of an effective symbol is used as the adjustment data and appended to the backward of the effective symbol unless otherwise stated in the following description.

Reference numeral 2209 denotes the transmission frequency converter. The transmission frequency converter 2209 uses a burst signal output from the burst signal generator 2204 to convert a signal output from the D/A converter 2203 to generate a carrier frequency signal and outputs it to the selector 2205.

As a result of the operations of the components described above, the transmission signal (TX) to the network adapter 1720 becomes a signal having a frame period approximately equal to the period of the WS signal that practically synchronizes with the clock of the player 1700, including a fluctuation of the period. The frame consists of a burst signal unit having a fixed length, an OFDM signal unit (including a GI unit and an effective symbol unit), and an adjustment data unit whose length changes according to the period and a fluctuation of the period of the WS signal or the WSR signal.

Figure 25:
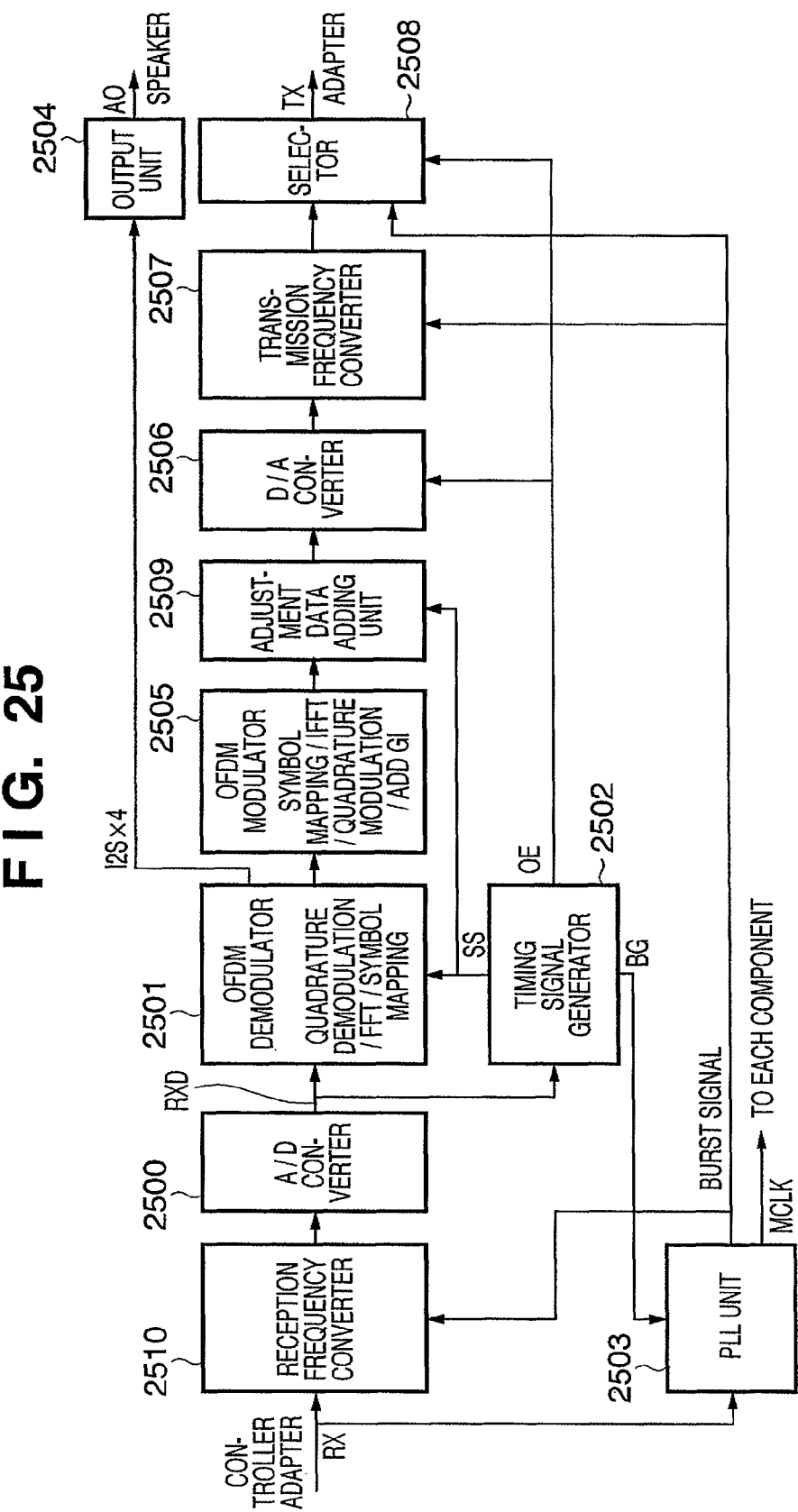
FIG. 25 is a block diagram of a network adapter 1720-1725 according to the fifth embodiment.
Figure 26:
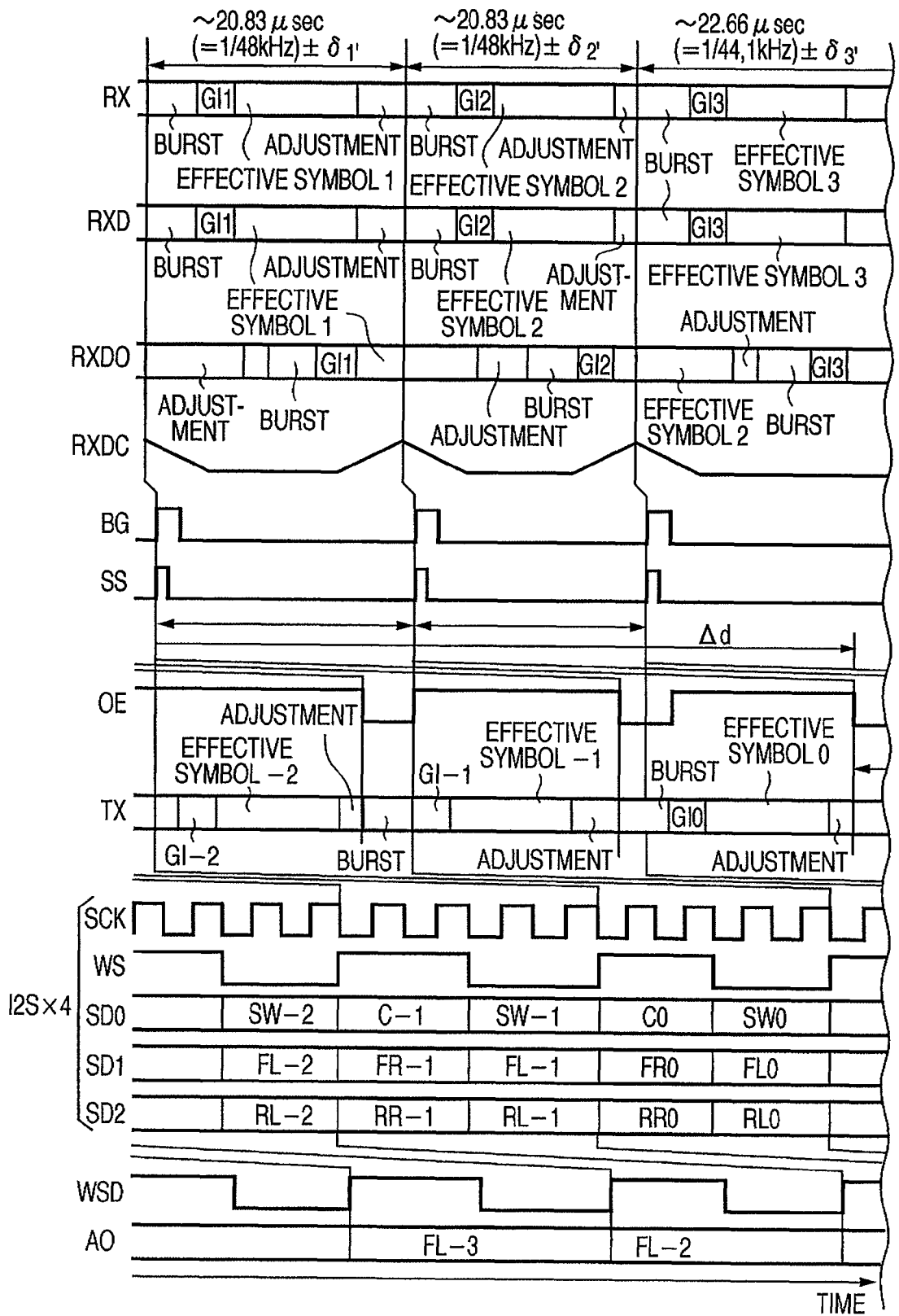
FIG. 26 is a timing chart of input/output signals and internal signals of the network adapter 1720-1725 according to the fifth embodiment.

A configuration and operation of the network adapters 1720-1725 will be described with reference to FIGS. 25 and 26. FIG. 25 is a block diagram of network adapters 1720-1725 and FIG. 26 is a timing chart of input and output signals and internal signals of the network adapters 1720-1725.

Reference numeral 2500 denotes an A/D converter. The A/D converter 2500 converts an analog intermediate frequency reception signal output from a reception frequency converter 2510 into a digital reception signal (RXD) and outputs it to an OFDM demodulator 2501 and a timing signal generator 2502.

Reference numeral 2501 denotes the OFDM demodulator. The OFDM demodulator 2501 uses a symbol synchronization signal (SS) output from a timing signal generator 2502 to obtain symbol synchronization and OFDM-demodulates an RXD signal input from the A/D converter 2500 to obtain a data frame (FIG. 19). Unlike the rising edge of an SS signal in a typical OFDM modulation and demodulation system, the rising edge of the SS signal in the embodiment is not at the start of a GI of the RXD signal. However, the SS signal can be used to obtain symbol synchronization because the burst signal length is fixed. The OFDM demodulator 2501 outputs the data frame obtained to an output unit 2504 along with a reproduction synchronization signal. I2SX4 which is similar to I2S is used for the output interface to the output unit 2504, like the output interface of the multi-channel audio decoder 2200 of the multi-speaker controller 1710.

I2SX4 in FIG. 25 is an output signal output from the OFDM demodulator 2501 to the output unit 2504. Here, the WS signal acts as a reproduction synchronization signal. The WS signal is generated from the SS signal output from the timing signal generator 2502 and has the same period as that of the SS signal, including a fluctuation of the period. The OFDM demodulator 2501 outputs audio data it received in a certain frame of an RX signal in a period of the WS signal corresponding to that frame. For example, GI1 and effective symbol 1 of the RX signal are output as C1, SW1, FR1, FL1, RR1, and RL1 of the signals SD0, SD1, and SD2. The I2SX4 signal output from the multi-channel audio decoder 2200 of the multi-speaker controller 1710 is reproduced here as an output signal of the OFDM demodulator 2201. The OFDM demodulator 2501 outputs the data frame it obtained to an OFDM modulator 2505 as well.

Reference numeral 2502 denotes the timing signal generator. The timing signal generator 2502 generates a burst gate signal (BG), an SS signal, and an output enable signal (OE) according to the RXD signal output from the A/D converter 2500. The timing signal generator 2502 outputs them to a PLL unit 2503, OFDM demodulator 2501, adjustment data adding unit 2509, D/A converter 2506, and selector 2508.

The SS signal can be generated based on a correlation signal (RXDC) between an RX signal and a signal (RXDD) that is the RX signal delayed by an effective symbol length, as widely known as a method for synchronizing symbols in an OFDM modulation and demodulation system. In doing this, it is effective to obtain a peak of the RXDC signal at a frame boundary. For this purpose, a technique disclosed in Japanese Patent No. 3807878 can be used. The SS signal rises upon detection of a peak of the RXDC signal and falls one clock after that.

Similarly, the BG and OE signals can be generated based on the RXDC signal. The BG signal rises upon detection of a peak of the RXDC signal, remains high until the end of the burst signal period, and then falls. The burst signal has a fixed length.

The OE signal falls after a predetermined period of time ($\Delta d$) has elapsed since the detection of a peak of the RXDC signal and rises after a period of time equal to the burst signal length (Tb) has elapsed. The period of time $\Delta d$ is determined such that audio data received in a certain frame of the RX signal can be output as a TX signal in a frame of a period corresponding to that frame. Accordingly, $\Delta d$ has at least a length equivalent to the burst signal length plus a period of time between the input of an RXD signal into the OFDM demodulator 2501 and the input of the RXD signal into the D/A converter 2506. For example, GI1 and effective symbol 1 of the RX signal are output as GI1 and effective signal 1 of the TX signal. It should be noted that FIG. 26 is a schematic diagram and RXDC signal waveform differs from an actual signal waveform except for the positions of peaks.

Reference numeral 2503 denotes the PLL unit. The PLL unit 2503 extracts a burst signal from an RX signal output from the multi-speaker controller 1710 or a network adapter connected upstream by using a BG signal output from the timing signal generator 2502 as a window signal. The PLL unit 2503 uses a phase lock loop (PLL) to generate continuous burst signals whose phase is synchronized with the PLL. The PLL unit 2503 outputs the generated burst signal to the reception frequency converter 2510, a transmission frequency converter 2507, and a selector 2508. The PLL unit 2503 multiplies the generated burst signal to generate a clock signal (MCLK). The PLL unit 2503 provides the generated MCLK signal to components of the network adapters. The components of the network adapters operate in synchronization with the MCLK signal. That is, the network adapters 1720-1725 use the burst signal for synchronization of their operation clocks and synchronization of frequencies relating to OFDM modulation and demodulation (carrier frequency synchronization and sampling frequency synchronization).

Reference numeral 2504 denotes the output unit. The output unit 2504 extracts audio data of the own channel from an I2SX4 signal input from the OFDM demodulator 2501. The output unit 2504 delays a WS signal in accordance with the network adapter at which data arrives latest to generate a WSD signal so that proper sound can be provided. The output unit 2504 converts digital audio data of the own channel to analog audio data at the rising edge of the WSD signal, then amplifies the data to generate audio signal (AO), and outputs the AO signal to the speaker. FIG. 26 shows an example in which data of the FL channel is extracted and is output as an AO signal.

Reference numeral 2505 denotes the OFDM modulator. The OFDM modulator 2505 OFDM-modulates a data frame input from the OFDM demodulator 2501 to generate OFDM symbol data including an effective symbol unit and a GI unit. Here, the OFDM modulator 2505 generates one piece of OFDM symbol data from one data frame. The OFDM modulator 2505 outputs the generated OFDM symbol data to the adjustment data adding unit 2509.

Reference numeral 2506 denotes the D/A converter. The D/A converter 2506 operates in synchronization with a clock signal (MCLK) output from the PLL unit 2503. The D/A converter 2506 converts digital data input from the adjustment data adding unit 2509 to analog data and outputs it to the transmission frequency converter 2507 when an output enable signal (OE) output from the timing signal generator 2502 is high. In this case, the D/A converter 2506 performs digital-to-analog-conversion to OFDM symbol data while the OE signal is high.

Reference numeral 2507 denotes the transmission frequency converter. The transmission frequency converter 2507 uses a burst signal output from the PLL unit 2503 to convert a signal output from the D/A converter 2506 to generate a carrier frequency signal and outputs to the selector 2508.

Reference numeral 2508 denotes the selector. The selector 2508 outputs the signal provided from the transmission frequency converter 2507 onto the transmission path to the network adapter 1720 when the OE signal output from the timing signal generator 2502 is high. On the other hand, the selector 2508 outputs the burst signal output from the PLL unit 2503 onto the transmission path to the network adapter 1720 when the OE signal output from the timing signal generator 2502 is low.

Reference numeral 2509 denotes the adjustment data adding unit. The adjustment data adding unit 2509 adds adjustment data having a length according to the period of an SS signal output from the timing signal generator 2502 and a fluctuation of the period to OFDM symbol data input from the OFDM modulator 2505 and outputs the resulting data to the D/A converter 2506. The adjustment data has a length that depends on an increase and decrease of the period of an SS signal measured at each rising edge of the SS signal. For example, in frame 1 in FIG. 26, the length of adjustment data is increased by an increase of the period of the SS signal, Tf2-Tf1. As a result, the increase of the adjustment data, Tg2-Tg1, becomes equal to Tf2-Tf1. The increase or decrease of the period of the SS signal is obtained by counting pulses of an MCLK signal output from the PLL unit 2503 and comparing the count value at the current period with the count value at the previous period. The minimum length of the adjustment data is determined so that the length is greater than or equal to 0 even when the period of the SS signal reduces to its minimum length.

Reference numeral 2510 denotes the reception frequency converter. The reception frequency converter 2510 receives a reception signal (RX) output from the multi-speaker controller 1710 or a network adapter connected upstream and converts the RX signal to an intermediate frequency by using a burst signal output from the PLL unit 2503 to generate an intermediate frequency reception signal. The reception frequency converter 2510 outputs the generated intermediate frequency reception signal to the A/D converter 2500.

As a result of the operations of the components described above, the transmission signal (TX) to the network adapter connected downstream becomes a signal having a frame period equal to that of a reception signal received from the multi-speaker controller 1710 or the network adapter connected upstream, including a fluctuation of the period. In the present embodiment, multi-channel audio data output from the player 1700 or an output signal from the multi-channel audio decoder 2200 of the multi-speaker controller 1710 corresponds to data input in multiple input periods. The reception signals at the network adapters 1730-1735 and output signals from the OFDM demodulator 2501 and the timing signal generator 2502 of the network adapters 1730-1735 also correspond to data input in multiple input periods.

While the multi-speaker controller 1710 in the embodiment described above sends data of one period of the WS signal in one frame, the multi-speaker controller 1710 may send data of multiple periods of the WS signal in one frame. In that case, the length of the adjustment data unit is changed in accordance with the length of the multiple periods of the WS signal at each of the multiple WS signal periods so that frame period can be made approximately equal to the multiple periods of the WS signal, including fluctuations of the periods. The period of the WS signal output from the OFDM demodulator 2501 of the network adapters 1730-1735 may be chosen to be the average period of the multiple WS signal periods, for example.

Data of one WS signal period may be sent in multiple frames. In that case, the length of the adjustment data unit of at least one of multiple frames that convey data of one WS signal period is changed according to the length of one period of the WS signal in each WS signal period so that the length of the period of the multiple frames is made approximately equal to the period of the WS signal, including a fluctuation of the length. Thus, the period of the WS signal output from the OFDM demodulator 2501 of the network adapters 1730-1735 can be made approximately equal to the period of the WS signal before transmission.

While the period of the WS signal is equal to the sampling period of audio data in the embodiment described above, the period of the WS signal may longer or shorter than the sampling period of audio data by a factor of n (where n is a positive integer). In that case, the output unit 2504 of the network adapters 1730-1735 performs processing for outputting an audio signal according to the output format of the audio decoder 2200 of the player 1700. For example, if the period of the WS signal is n times longer than the sample period of audio data, an audio signal is output in synchronization with the WS signal multiplied by n. On the other hand, if the period of the WS signal is one n-th of the sampling period of audio data, an audio signal which is synchronized with the WS signal in n periods is output.

While adjustment data is the same data as that at the forward of an effective symbol and is appended to the backward of the effective symbol, adjustment data may be any data or null data (no-signal) and can be inserted in any position. For example, adjustment data may be added to the forward of a GI so that the adjustment data functions as a part of the GI. This is practically the same that the length of the GI changes in accordance with the period of the WS signal or a fluctuation of the period.

Signals such as I2SX4, TX, and RX signals are shown being continuous without interruptions when the sampling frequency of audio data output from the player 1700 changes in the drawings used in the description of the present embodiment. However, when the sampling frequency of audio data output from the player 1700 changes, these signals may be interrupted or discontinuous near the point of the change.

Because a frame includes a burst signal in the present embodiment, the present embodiment is useful for a case where synchronization between operation clocks of a transmitter and a receiver or frequency synchronization relating to modulation and demodulation between the transmitter and receiver is required.

Furthermore, because a portion that does not contain significant data is provided separately from a portion containing significant data in transmission of data and the length of that portion is changed in the present embodiment, the present embodiment is useful for a case where it is difficult to change the length of a portion containing significant data.

Therefore, the present embodiment is useful for a case where synchronization of frequencies related to modulation and demodulation between a transmitter and a receiver is required as with the OFDM modulation and demodulation scheme and where it is difficult to change the length of a portion containing significant data (effective symbol in the case of the OFDM modulation and demodulation scheme). The present embodiment has been described with respect to an example in which audio data is transmitted. However, the present invention is not limited to this; the present invention can be widely applied to transmission of streaming data that requires punctuality, such as video data (including video data that includes audio data) and various kinds of measurement data.

Figure 27:
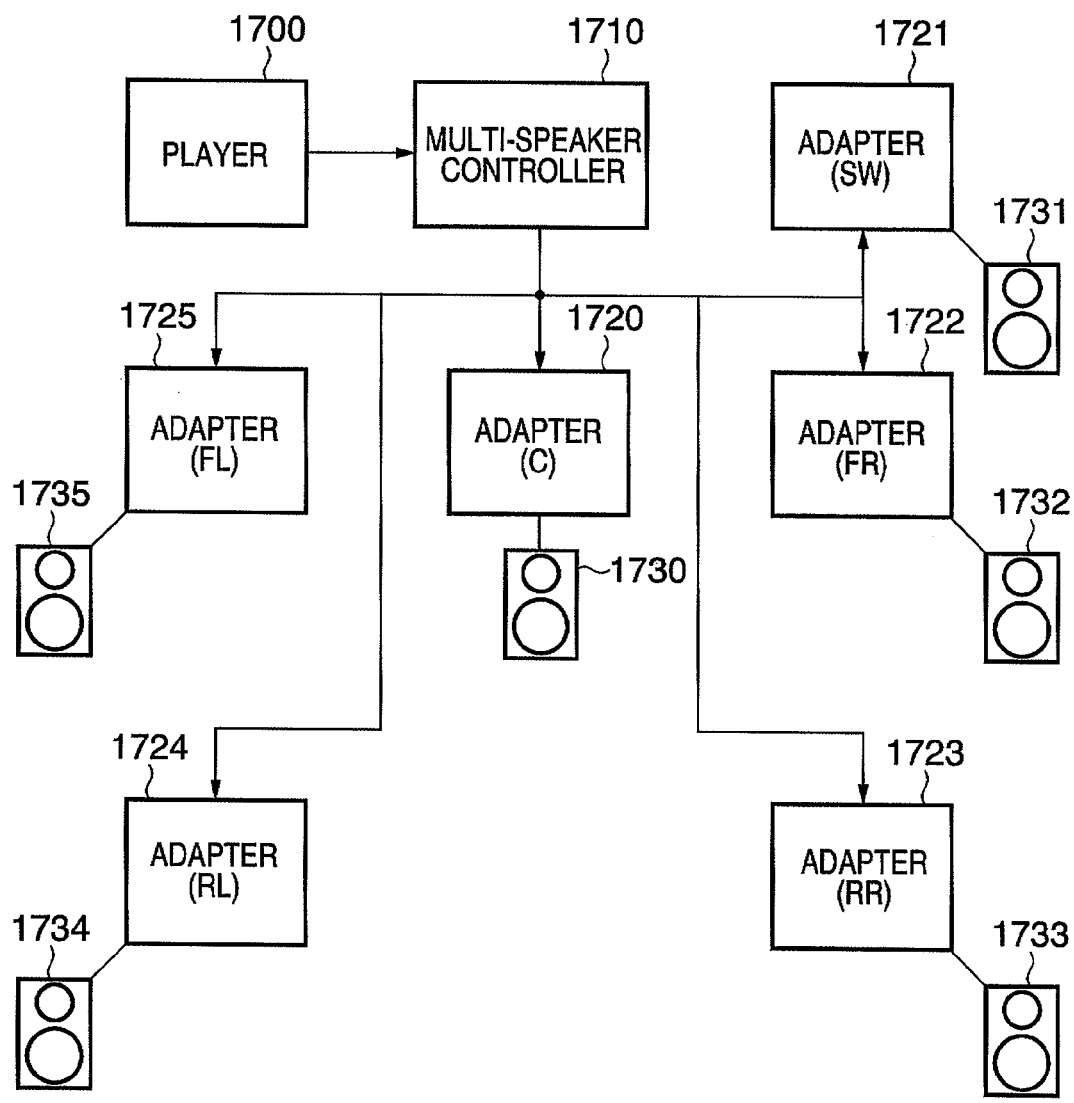
FIG. 27 is a block diagram of a 5.1-channel surround sound system using a bus connection.

The fourth and fifth embodiments have been described in which the multi-speaker controller 1710 and network adapters 1721-1725 are interconnected through cables in a daisy chain mode. However, the present invention is not limited to this. The multi-speaker controller 1710 and network adapters 1721-1725 may be interconnected in a bus mode as shown in FIG. 27. This mode eliminates the need for transmission from a network adapter among the network adapters 1721-1725 to a network adapter connected downstream from that network adapter. The need for correction of differences in data arrival time among the network adapters by the output unit 2204, 2205 is also eliminated.

As has been described above, a communication system includes a transmitter and a receiver and the transmitter receives data input in multiple input periods. Continuous frames are generated and transmitted each of which includes a variable-length part whose length varies depending on the input periods and a fixed-length part containing data of one period or n periods or one n-th of one period of the input periods (where n is a positive integer). Each of the frames has a period equal to one period or n periods or one n-th of one period of the input periods. The receiver receives the continuous frames transmitted and detects the period of the frames it received. The receiver then reproduces data input in the multiple periods based on the detected period of the frames. The variable-length part contains a signal for synchronizing operation clocks or frequencies relating to modulation and demodulation of the data between said communication apparatus and another communication apparatus.

The fixed-length part contains a signal for synchronizing operation clocks or frequencies relating to modulation and demodulation of the data between the communication apparatus and another communication apparatus.

The variable-length part does not contain a signal consisting of significant data in transmission of data input in the multiple input periods.

The data contained in the fixed-length part is modulated using orthogonal frequency division multiplexing.

The variable-length part is positioned adjacent to an effective symbol or a guard interval obtained by modulating data of one period or n periods or one n-th of one period of the input periods that is contained in the fixed-length part (where n is a positive integer) by using orthogonal frequency division multiplexing. The variable-length part is: (i) a signal in which orthogonality between subcarriers into which data of one period or n periods or one n-th of one period of the input periods is divided is maintained in an interval having a length equal to that of the effective symbol of a signal consisting of the variable-length part and the effective symbol, or (ii) a signal in which orthogonality between subcarriers into which data of one period or n periods or one n-th of one period of the input periods is divided is maintained in an interval, having a length equal to the effective symbol, of a signal consisting of the variable-length part and the guard interval, or (iii) a signal in which orthogonality between subcarriers into which data of one period or n periods or one n-th of one period of the input periods is divided is maintained in an interval having a length equal to that of the effective symbol of a signal consisting of the variable-length part, the guard interval, and the effective symbol.

The data input in the multiple input periods is streaming data. The input period is equal to the sampling period of the streaming data or longer or shorter than the sampling period by a factor of m (where m is a positive integer).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-057242, filed Mar. 7, 2007, and Japanese Patent Application No. 2008-025235, filed Feb. 5, 2008, which are hereby incorporated by reference herein in their entirety.

What is claimed is:

1. A communication system including a transmitter and a receiver, the transmitter comprising:
   a first receiving unit constructed to receive continuous data input in a plurality of sampling periods;
   a sampling period identifying unit constructed to identify a sampling period of the continuous data received by the receiving unit;
   a generating unit constructed to generate continuous frames from the continuous data received by the receiving unit, each of the frames including a variable-length part and a fixed-length part containing data of one period or n periods or one n-th of one period of the plurality of sampling periods, where n is a positive integer, and each frame length of each of the frames is adjusted to a period equal to one period or n periods or one n-th of one period of the plurality of sampling periods by varying the length of the variable-length part in accordance with the sampling period identified by the sampling period identifying unit; and
   a transmitting unit constructed to transmit the continuous frames generated by the generating unit, and
   the receiver comprising:
   a second receiving unit constructed to receive the continuous frames transmitted by the transmitting unit;
   a detecting unit constructed to detect a period of the frames received by the second receiving unit; and
   a reproducing unit constructed to reproduce the data input in the plurality of sampling periods on the basis of the period of the frames detected by the detecting unit,
   wherein the data contained in the fixed-length part is modulated by using orthogonal frequency division multiplexing.

2. A communication apparatus comprising:
   a receiving unit constructed to receive continuous data input in a plurality of sampling periods;

a sampling period identifying unit identifying a sampling period of the continuous data received by the receiving unit;

a generating unit constructed to generate continuous frames from the continuous data received by the receiving unit, each of the frames including a variable-length part and a fixed-length part containing data of one period or n periods or one n-th of one period of the plurality of sampling periods, where n is a positive integer, and each frame length of each of the frames is adjusted to having a period equal to one period or n periods or one n-th of one period of the plurality of sampling periods by varying the length of the variable-length part in accordance with the sampling period identified by the sampling period identifying unit; and a transmitting unit transmitting constructed to transmit the continuous frames generated by the generating unit, wherein the data contained in the fixed-length part is modulated by using orthogonal frequency division multiplexing.

3. The communication apparatus according to claim 2, wherein the variable-length part contains a signal for synchronizing operation clocks or frequencies relating to modulation and demodulation of the data between the communication apparatus and another communication apparatus.

4. The communication apparatus according to claim 2, wherein the fixed-length part contains a signal for synchronizing operation clocks or frequencies relating to modulation and demodulation of the data between the communication apparatus and another communication apparatus.

5. The communication apparatus according to claim 2, wherein the variable-length part does not contain a signal including significant data in transmission of data input in the plurality of sampling periods.

6. The communication apparatus according to claim 2, wherein the data contained in the fixed-length part is modulated by using orthogonal frequency division multiplexing;

the variable-length part is positioned adjacent to an effective symbol or a guard interval obtained by modulating data of one period or n periods or one n-th of one period of the plurality of sampling periods contained in the fixed-length part by using orthogonal frequency division multiplexing, where n is a positive integer; and the variable-length part is a signal in which orthogonality between subcarriers into which data of one period or n periods or one n-th of one period of the input periods is divided is maintained in an interval of a signal including (i) the variable-length part and the effective symbol, or (ii) the variable-length part and the guard interval, or (iii) the variable length part, the guard interval, and the effective symbol, the interval having a length equal to the effective symbol.

7. The communication apparatus according to claim 2, wherein the data input in the plurality of sampling periods is streaming data; and each of the plurality of sampling periods is equal to a sampling period of the streaming data or longer or shorter than the sampling period by a factor of m, where m is a positive integer.

8. A control method in a communication system including a transmitter and a receiver, the method comprising:

at the transmitter, a first receiving step of receiving continuous data input in a plurality of sampling periods;

a sampling period identifying step of identifying a sampling period of the continuous data received in the receiving step;

a generating step of generating continuous frames from the continuous data received at the receiving step, each of the frames including a variable-length part and a fixed-length part containing data of one period or n periods or one n-th of one period of the plurality of sampling periods, where n is a positive integer, and each frame length of each of the frames is adjusted to having a period equal to one period or n periods or one n-th of one period of the plurality of sampling periods by varying the length of the variable-length part in accordance with the sampling period identified in the sampling period identifying step; and a transmitting step of transmitting the continuous frames generated at the generating step; and at the receiver, a second receiving step of receiving the continuous frames transmitted at the transmitting step;

a detecting step of detecting a period of the frames received at the second receiving step; and a reproducing step of reproducing the data input in the plurality of sampling periods on the basis of the period of the frames detected at the detecting step, wherein the data contained in the fixed-length part is modulated by using orthogonal frequency division multiplexing.

9. A method for controlling a communication apparatus comprising the steps of:

receiving continuous data input in a plurality of sampling periods;

identifying a sampling period of the continuous data received in the receiving step;

generating continuous frames from the continuous data received at the receiving step, each of the frames including a variable-length part and a fixed-length part containing data of one period or n periods or one n-th of one period of the plurality of sampling periods, where n is a positive integer, and each frame length of each of the frames is adjusted to having a period equal to one period or n periods or one n-th of one period of the plurality of sampling periods by varying the length of the variable-length part in accordance with the sampling period identified in the identifying step; and transmitting the continuous frames generated at the generating step, wherein the data contained in the fixed-length part is modulated by using orthogonal frequency division multiplexing.

* * * * *